US011791978B2

(12) United States Patent
Qureshi

(10) Patent No.: US 11,791,978 B2
(45) Date of Patent: Oct. 17, 2023

(54) SYSTEMS AND METHODS FOR PREVENTING SIDE-CHANNEL ATTACKS

(71) Applicant: Georgia Tech Research Corporation, Atlanta, GA (US)

(72) Inventor: Moinuddin Qureshi, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 373 days.

(21) Appl. No.: 17/270,259

(22) PCT Filed: Aug. 29, 2019

(86) PCT No.: PCT/US2019/048815
§ 371 (c)(1),
(2) Date: Feb. 22, 2021

(87) PCT Pub. No.: WO2020/047258
PCT Pub. Date: Mar. 5, 2020

(65) Prior Publication Data
US 2021/0336763 A1    Oct. 28, 2021

Related U.S. Application Data

(60) Provisional application No. 62/724,100, filed on Aug. 29, 2018.

(51) Int. Cl.
*H04L 9/00*   (2022.01)
*G06F 12/084*   (2016.01)
(Continued)

(52) U.S. Cl.
CPC ............ *H04L 9/005* (2013.01); *G06F 12/084* (2013.01); *H04L 9/0625* (2013.01);
(Continued)

(58) Field of Classification Search
CPC .... G06F 12/084; G06F 12/0886; G06F 21/71; G06F 21/79; G06F 2212/401;
(Continued)

(56) References Cited

U.S. PATENT DOCUMENTS 5,752,261 A    5/1998   Cockcroft, Jr.
6,185,304 B1 *  2/2001   Coppersmith .......... H04L 9/002
                                                    380/37
(Continued)

FOREIGN PATENT DOCUMENTS

CN         102625995        1/2015

OTHER PUBLICATIONS

Search Report and Written Opinion from Application No. PCT/US2019/48815 dated Dec. 30, 2019 (10 pages).
(Continued)

*Primary Examiner* — Sharon S Lynch
(74) *Attorney, Agent, or Firm* — Troutman Pepper Hamilton Sanders LLP; Ryan A. Schneider; Christopher C. Close, Jr.

(57) ABSTRACT

Disclosed herein is a method of accessing a cache, the method comprising: mapping respective physical line addresses (PLAs) of a plurality of PLAs to respective cache locations of a plurality of cache locations in a cache, each PLA of the plurality of PLAs having an associated memory line; encrypting, with a block cipher using a first key, a first PLA of the plurality of PLAs to provide a first encrypted line address (ELA), the first ELA having an associated first encrypted cache location; upon receiving a request to access a first memory line associated with the first PLA, encrypting, using the first key, the first PLA into the first ELA to determine the associated first encrypted cache location; and accessing the first encrypted cache location. Also disclosed herein are systems for implementing the same.

15 Claims, 17 Drawing Sheets

(51) Int. Cl.
  *H04L 9/06* (2006.01)
  *H04L 9/14* (2006.01)
  *G06F 7/58* (2006.01)

(52) U.S. Cl.
  CPC .............. *H04L 9/0631* (2013.01); *H04L 9/14* (2013.01); *G06F 7/588* (2013.01); *G06F 2212/1052* (2013.01)

(58) Field of Classification Search
  CPC . G06F 7/588; G06F 2212/1052; H04L 9/005; H04L 9/0625; H04L 9/0631; H04L 9/14
  See application file for complete search history.

(56) References Cited

U.S. PATENT DOCUMENTS

| | | | | |
|---|---|---|---|---|
| 7,975,109 | B2* | 7/2011 | McWilliams | G06F 12/0806 711/E12.066 |
| 8,244,969 | B2* | 8/2012 | McWilliams | G06F 12/0802 711/202 |
| 8,667,212 | B2* | 3/2014 | McWilliams | G06F 12/0806 711/165 |
| 8,700,899 | B1* | 4/2014 | Juels | H04W 12/043 380/47 |
| 9,128,876 | B2* | 9/2015 | Cordella | G06F 21/78 |
| 9,262,342 | B2 | 2/2016 | Diep et al. | |
| 9,342,256 | B2* | 5/2016 | Peterson | G06F 11/1402 |
| 9,767,318 | B1 | 9/2017 | Dropps | |
| 9,990,249 | B2* | 6/2018 | Durham | G06F 11/1048 |
| 10,311,229 | B1* | 6/2019 | Pohlack | G06F 8/41 |
| 10,585,809 | B2* | 3/2020 | Durham | G06F 21/79 |
| 10,706,164 | B2* | 7/2020 | LeMay | G06F 21/78 |
| 10,846,279 | B2* | 11/2020 | Kimura | G06F 16/2315 |
| 10,868,665 | B1* | 12/2020 | Pohlack | H04L 63/1441 |
| 11,010,310 | B2* | 5/2021 | Durham | G06F 21/64 |
| 11,087,017 | B1* | 8/2021 | Mare | G06F 16/953 |
| 2003/0065929 | A1 | 4/2003 | Milliken | |
| 2005/0206499 | A1* | 9/2005 | Fisher | E05B 19/0005 713/185 |
| 2011/0289263 | A1* | 11/2011 | McWilliams | G06F 12/0802 711/E12.008 |
| 2012/0297110 | A1* | 11/2012 | Kavi | G06F 12/1408 711/3 |
| 2012/0311246 | A1* | 12/2012 | McWilliams | G06F 12/0802 711/E12.008 |
| 2013/0145177 | A1* | 6/2013 | Cordella | G06F 21/78 713/193 |
| 2017/0185532 | A1* | 6/2017 | Durham | G06F 12/0886 |
| 2017/0285976 | A1* | 10/2017 | Durham | G06F 21/64 |
| 2017/0371912 | A1* | 12/2017 | Kimura | G06F 16/2365 |
| 2019/0102567 | A1* | 4/2019 | Lemay | G06F 21/44 |
| 2019/0196982 | A1* | 6/2019 | Rozas | G06F 3/065 |
| 2020/0278937 | A1* | 9/2020 | Durham | G06F 12/1408 |

OTHER PUBLICATIONS

"Fiestel Block Cipher," Tutorialspoint; May 19, 2017 https://www.tutorialspoint.com/cryptography/feistel_block_cipher.htm; pp. 1-2.

* cited by examiner

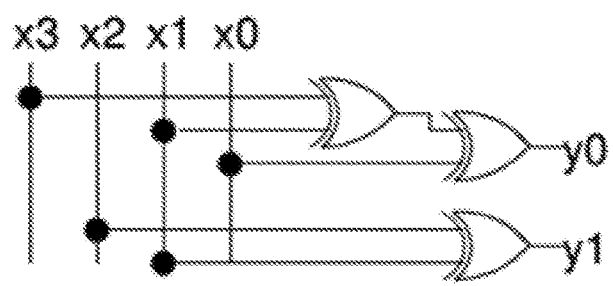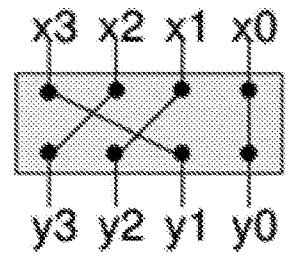
Fig. 6a-d

SYSTEMS AND METHODS FOR PREVENTING SIDE-CHANNEL ATTACKS

CROSS REFERENCE TO RELATED APPLICATIONS

This application claims the benefit of U.S. Provisional Application Ser. No. 62/724,100, filed on Aug. 29, 2018, which is incorporated herein by reference in its entirety as if fully set forth below.

FIELD OF THE DISCLOSURE

The present disclosure relates generally to systems and methods for preventing side-channel attacks. Particularly, embodiments of the present disclosure relate to encryption of physical line addresses in a cache to prevent side-channel attacks.

BACKGROUND

Caches alleviate the long latency of main memories by providing data with low latency. Unfortunately, the timing difference between the cache-hit and a cache-miss can be used as a side-channel by an adversary to infer the access pattern and obtain unauthorized information from the system. The recently disclosed Spectre and Meltdown vulnerabilities rely on such cache-based side channels to convert the unauthorized data value into discernible information. While cache attacks have been demonstrated in the past at a smaller scale, the recent vulnerabilities show that cache attacks can affect hundreds of millions of processor systems and highlight the need to develop efficient solutions to mitigate cache attacks.

Eviction-based cache attacks are an important class of cache side-channels, where an adversary can carefully orchestrate cache evictions to learn the access pattern of a co-running application and use this access pattern to infer secrets (such as Advanced Encryption Standard (AES) keys). Eviction-based attacks are feasible when the adversary and the victim share some storage structures. Modern processors pack multiple cores on a single chip and tend to keep the level-1 (L1) and level-2 (L2) caches private to the core. However, the last-level cache (LLC) is typically shared between all the cores to efficiently utilize the cache space. Unfortunately, such sharing makes the LLC vulnerable to eviction-based attacks as an adversary can learn about the access pattern of the victim using LLC evictions, even when the adversary and the victim are executing on different cores.

Architectural solutions to mitigate eviction-based attacks broadly fall in two categories. First, preservation-based mitigation, whereby the lines of the victim are preserved within the cache, making it harder for the adversary to dislodge the content of the victim. Unfortunately, dedicating portions of the LLC for each core results in inefficient use of cache space. Second, randomization-based mitigation, whereby the location of the line in the cache is determined randomly and this information is stored in a table. To protect the mapping table from being attacked, the OS is required to group the applications into protected and unprotected groups and only the protected applications are allowed to use the mapping table and randomization. While such Table-Based Randomization may be feasible for L1 cache, the size of the mapping tables becomes impractically large for the LLC, as the number of entries in the mapping table increases linearly with the number of cache lines and the number of concurrently running protected applications. Furthermore, the efficacy of prior randomization-based scheme is dependent on the ability of the Operating System (OS) to correctly classify applications into protected and unprotected groups.

What is needed, therefore, are caching systems that can efficiently protect the LLC against eviction-based attacks without relying on any software support. Also desirable are systems that provide high security for long periods of time while incurring less storage and processor overhead than past solutions. Embodiments of the present disclosure address this need as well as other needs that will become apparent upon reading the description below in conjunction with the drawings.

BRIEF SUMMARY OF THE INVENTION

The present disclosure relates generally to systems and methods for preventing side-channel attacks. Particularly, embodiments of the present disclosure relate encryption of physical line addresses in a cache to prevent side-channel attacks. An exemplary embodiment of the present invention can provide a method of accessing a cache, the method comprising: mapping respective physical line addresses (PLAs) of a plurality of PLAs to respective cache locations of a plurality of cache locations in a cache, each PLA of the plurality of PLAs having an associated memory line; encrypting, with a block cipher using a first key, a first PLA of the plurality of PLAs to provide a first encrypted line address (ELA), the first ELA having an associated first encrypted cache location; upon receiving a request to access a first memory line associated with the first PLA, encrypting, using the first key, the first PLA into the first ELA to determine the associated first encrypted cache location; and accessing the first encrypted cache location.

In any of the embodiments disclosed herein, accessing the first encrypted cache location can further comprise transmitting data stored at the first encrypted cache location.

In any of the embodiments disclosed herein, the block cipher can comprise a low-latency block cipher comprising a four-stage Fiestel Network having a round function.

In any of the embodiments disclosed herein, the round function can comprise a substitution-permutation network, and wherein the substitution-permutation network is configured randomly at each stage of the four-stage Fiestel Network.

In any of the embodiments disclosed herein, the method can further comprise: generating a first epoch identifier with the first key and a second epoch identifier with a second key; associating the first key with the first epoch identifier and the second key with the second epoch identifier; assigning the first epoch identifier to the first ELA; encrypting, with a block cipher using the second key, a second PLA of the plurality of PLAs to provide a second ELA, the second ELA having an associated second encrypted cache location; assigning the second epoch identifier to the second ELA; and designating a relocation pointer to be remapped using the second key, wherein the relocation pointer designates one or more cache locations selected from at least one of a cache set, a cache way, a cache bank, or the cache.

In any of the embodiments disclosed herein, the method can further comprise: recording, in a counter, a number of times that the cache has been accessed; determining that the counter is greater than a predetermined threshold; and encrypting, with the block-cipher using the second key, the relocation pointer, such that the one or more cache locations are respectively remapped with a new ELA, each new ELA having the second epoch identifier assigned thereto.

In any of the embodiments disclosed herein, the method can further comprise: generating, with a random number generator, a random number; determining that the random number matches a predetermined value; and encrypting, with the block-cipher using the second key, the relocation pointer, such that the one or more cache locations are respectively remapped with a new ELA, each new ELA having the second epoch identifier assigned thereto.

In any of the embodiments disclosed herein, the method can further comprise: determining that each of the plurality of ELAs is encrypted with the second key; disassociating the first key from the first epoch identifier; associating the second key with the first epoch identifier; and associating a third key with the second epoch identifier.

In any of the embodiments disclosed herein, the method can further comprise: upon receiving a new request to access the first memory line associated with the first PLA and determining that the first ELA is identified with the second epoch identifier, encrypting, with the block cipher using the second key, the first PLA to provide a re-encrypted first ELA having an associated updated first encrypted cache location; and accessing the associated updated first encrypted cache location.

In any of the embodiments disclosed herein, the method can further comprise: partitioning the cache into two or more partitions, each partition having (i) a first key and a second key associated therewith, the first key and the second key separate from any keys associated with any other partitions and (ii) a first epoch identifier and a second epoch identifier associated therewith, the first and the second epoch identifier separate from any epoch identifiers associated with any other partitions; wherein the new request to access the first memory line associated with the first PLA is received and processed by each of the two or more partitions independently and simultaneously.

Another embodiment of the present disclosure can provide a system for preventing conflict-based cache attacks, the system comprising: a memory comprising a plurality of memory lines; a processor in communication with the memory and the one or more storage devices, the processor comprising: a plurality of cores; and a cache comprising a plurality of cache locations shared between the plurality of cores; wherein respective physical line addresses (PLAs) of a plurality of PLAs are mapped to respective cache locations of the plurality of cache locations in the cache, each PLA of the plurality of PLAs having an associated memory line of the plurality of memory lines; and wherein the processor executes one or more instructions that cause the system to: encrypt, with a block cipher using a first key, a first PLA of the plurality of PLAs to provide a first encrypted line address (ELA), the first ELA having an associated first encrypted cache location; upon receiving a request to access a first memory line associated with the first PLA, encrypt, using the first key, the first PLA into the first ELA to determine the associated first encrypted cache location; and access the first encrypted cache location.

In any of the embodiments disclosed herein, the instructions can further cause the system to transmit data stored at the first cache location.

In any of the embodiments disclosed herein, the block cipher can comprise a low-latency block cipher comprising a four-stage Fiestel Network having a round function.

In any of the embodiments disclosed herein, the round function can comprise a substitution-permutation network, and wherein the substitution-permutation network is configured randomly at each stage of the four-stage Fiestel Network.

In any of the embodiments disclosed herein, the instructions can further cause the system to: generate a first epoch identifier with the first key and a second epoch identifier with a second key; associating the first key with the first epoch identifier and the second key with the second epoch identifier; assign the first epoch identifier to the first ELA; encrypt, with a block cipher using the second key, a second PLA of the plurality of PLAs to provide a second ELA, the second ELA having an associated second encrypted cache location; assign the second epoch identifier to the second ELA; and designate a relocation pointer to be remapped using the second key, wherein the relocation pointer designates one or more cache locations selected from at least one of: a cache set, a cache way, a cache bank, or the cache.

In any of the embodiments disclosed herein, the instructions can further cause the system to: record, in a counter, a number of times that the cache has been accessed; determine that the counter is greater than a predetermined threshold; and encrypt, with the block-cipher using the second key, the relocation pointer, such that the one or more cache locations are respectively remapped with a new ELA, each new ELA having the second epoch identifier assigned thereto.

In any of the embodiments disclosed herein, the instructions can further cause the system to: generate, with a random number generator, a random number; determine that the random number matches a predetermined value; and encrypt, with the block-cipher using the second key, the relocation pointer, such that the one or more cache locations are respectively remapped with a new ELA, each new ELA having the second epoch identifier assigned thereto.

In any of the embodiments disclosed herein, the instructions can further cause the system to: determine that each of the plurality of ELAs is encrypted with the second key; disassociate the first key from the first epoch identifier; associate the second key with the first epoch identifier; and associate a third key with the second epoch identifier.

In any of the embodiments disclosed herein, the instructions can further cause the system to: upon receiving a new request to access the first memory line associated with the first PLA and determining that the first ELA is identified with the second epoch identifier, encrypt, with the block cipher using the second key, the first PLA to provide a re-encrypted first ELA having an associated updated first encrypted cache location; and access the associated updated first encrypted cache location.

In any of the embodiments disclosed herein, the instructions can further cause the system to: partition the cache into two or more partitions, each partition having (i) a first key and a second key associated therewith, the first key and the second key separate from any keys associated with any other partitions and (ii) a first epoch identifier and a second epoch identifier associated therewith, the first and the second epoch identifier separate from any epoch identifiers associated with any other partitions; wherein the new request to access the first memory line associated with the first PLA is received and processed by each of the two or more partitions independently and simultaneously.

These and other aspects of the present invention are described in the Detailed Description of the Invention below and the accompanying figures. Other aspects and features of embodiments of the present invention will become apparent to those of ordinary skill in the art upon reviewing the following description of specific, exemplary embodiments of the present invention in concert with the figures. While features of the present invention may be discussed relative to certain embodiments and figures, all embodiments of the present invention can include one or more of the features discussed herein. Further, while one or more embodiments may be discussed as having certain advantageous features, one or more of such features may also be used with the various embodiments of the invention discussed herein. In similar fashion, while exemplary embodiments may be discussed below as device, system, or method embodiments, it is to be understood that such exemplary embodiments can be implemented in various devices, systems, and methods of the present invention.

BRIEF DESCRIPTION OF THE DRAWINGS

The accompanying drawings, which are incorporated in and constitute a part of this specification, illustrate multiple embodiments of the presently disclosed subject matter and serve to explain the principles of the presently disclosed subject matter. The drawings are not intended to limit the scope of the presently disclosed subject matter in any manner.

FIG. 6a-d illustrate a four-stage substitution-permutation network used in a low-latency block-cipher used to encrypt caches according to some embodiments of the present disclosure.

DETAILED DESCRIPTION

Figure 1A:
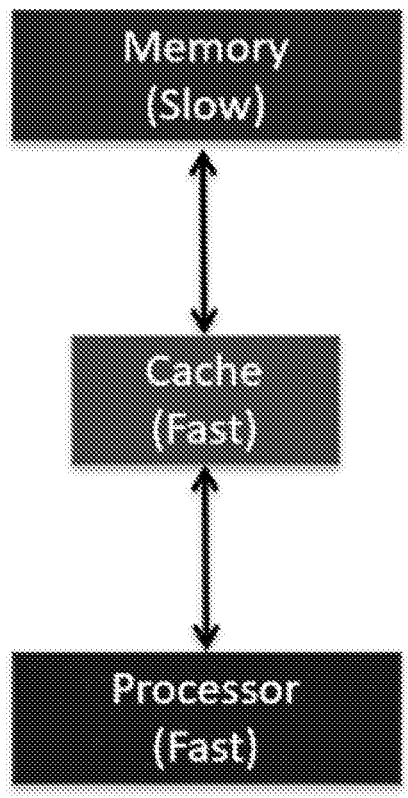
FIG. 1a illustrates an exemplary system for accessing a cache used according to some embodiments of the present disclosure.

Although certain embodiments of the disclosure are explained in detail, it is to be understood that other embodiments are contemplated. Accordingly, it is not intended that the disclosure is limited in its scope to the details of construction and arrangement of components set forth in the following description or illustrated in the drawings. Other embodiments of the disclosure are capable of being practiced or carried out in various ways. Also, in describing the embodiments, specific terminology will be resorted to for the sake of clarity. It is intended that each term contemplates its broadest meaning as understood by those skilled in the art and includes all technical equivalents which operate in a similar manner to accomplish a similar purpose.

Herein, the use of terms such as "having," "has," "including," or "includes" are open-ended and are intended to have the same meaning as terms such as "comprising" or "comprises" and not preclude the presence of other structure, material, or acts. Similarly, though the use of terms such as "can" or "may" are intended to be open-ended and to reflect that structure, material, or acts are not necessary, the failure to use such terms is not intended to reflect that structure, material, or acts are essential. To the extent that structure, material, or acts are presently considered to be essential, they are identified as such.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified.

The components described hereinafter as making up various elements of the disclosure are intended to be illustrative and not restrictive. Many suitable components that would perform the same or similar functions as the components described herein are intended to be embraced within the scope of the disclosure. Such other components not described herein can include, but are not limited to, for example, similar components that are developed after development of the presently disclosed subject matter.

Modern computers use caches to bridge the long latency between the fast processor and slow memory, as shown in FIG. 1a. In some cases, the data requested by the processor can be present in the cache (termed as "cache hit") and can be returned to the processor with low latency. When the requested data is not present in the cache (termed as "cache miss"), the processor can obtain the data from memory and place it in the cache for low-latency retrieval on subsequent accesses to that data item. The granularity at which the data is requested from the memory is called a "line" in memory. Each line in memory is identified with a "Physical Line Address (PLA)". The space in the cache is organized at the granularity of a line as well. The typical size of a line is 64 bytes (although some systems can also use a line size of either 128 bytes or 256 bytes).

Figure 1B:
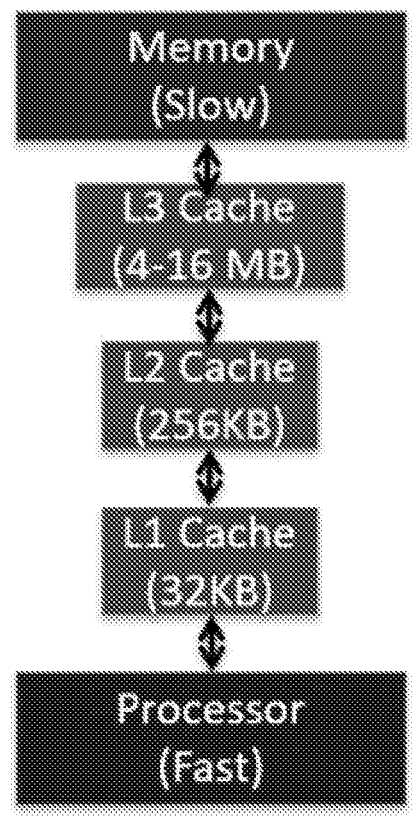
FIG. 1b illustrates an exemplary system for accessing multiple cache levels used according to some embodiments of the present disclosure.

To obtain a higher cache hit-rate, a larger cache can be used. However, a large cache is also slow. To obtain a low latency and also have the capacity of a larger cache, some modern systems can use a multi-level cache hierarchy. FIG. 1b shows an exemplary system with three layers of cache hierarchy. The first level cache is optimized for the lowest latency and has a capacity of 32 kilobytes or 64 kilobytes; whereas the third level cache has capacity of several megabytes and can incur a latency of ten or more cycles, for example.

Figure 1C:
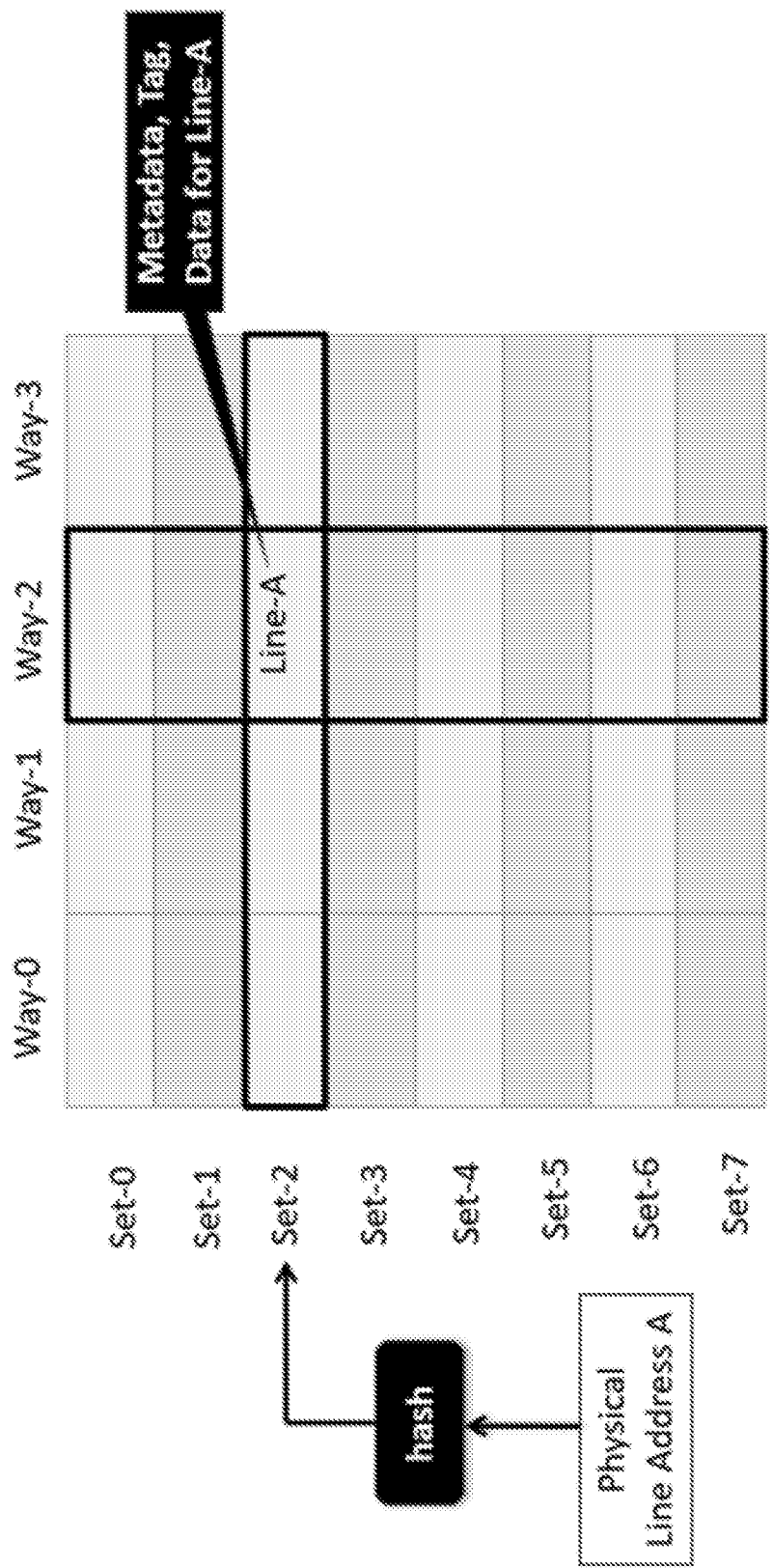
FIG. 1c illustrates an exemplary system for accessing a cache used according to some embodiments of the present disclosure.

An access can result in either a cache hit or a cache miss, depending on whether the line is present in the cache or not. To speed up the process of looking up the cache, the cache can be organized as a two-dimensional array, as shown in FIG. 1c. The rows of a cache are called "sets" and the columns are called "ways." If a third dimension is added to the array, then each plane of sets and ways is called a "bank." A given line (i.e., a line in memory) could be present in any of the ways of a designated set. The designated set for a cache line is determined passing the line address (for a line in memory) through a hashing function. The commonly used hashing function can simply be using the bottom K bits of a line address, if the cache contains $2^K$ sets. For example, in FIG. 1c, the requested line corresponding to the Physical Line Address "A" gets mapped to "Set-2". The line could be present in any of the ways in Set-2, so all four locations can be checked to determine a cache hit or miss. As shown in FIG. 1c, the line is present in Way-2 of Set-2 and the access would result in a cache hit. Note that each cache location not only stores the data for a line, but also stores a "tag" that identifies the Line Address for which the data is stored, and some metadata (such as valid bit, replacement bits etc.).

Unfortunately, the timing difference between a cache hit and a cache miss can be used as a side-channel by an adversary to infer the access pattern and obtain unauthorized information from the system. Eviction-based attacks are feasible when the adversary and the victim share some storage structures. Modern processors pack multiple cores on a single chip and tend to keep the level-1 (L1) and level-2 (L2) caches private to the core. However, the last-level cache (LLC) is typically shared between all the cores to efficiently utilize the cache space. Unfortunately, such sharing makes the LLC vulnerable to eviction-based attacks as an adversary can learn about the access pattern of the victim using LLC evictions, even when the adversary and the victim are executing on different cores. While cache attacks have been demonstrated in the past at a smaller scale, recent vulnerabilities show that cache attacks can affect hundreds of millions of processor systems and highlight the need to develop efficient solutions to mitigate cache attacks.

As described above, architectural solutions to mitigate eviction-based attacks broadly fall in two categories. First, preservation-based mitigation, whereby the lines of the victim are preserved within the cache, making it harder for the adversary to dislodge the content of the victim. Unfortunately, dedicating portions of the LLC for each core results in inefficient use of cache space. Second, randomization-based mitigation, whereby the location of the line in the cache is determined randomly and this information is stored in a table. To protect the mapping table from being attacked, the OS is required to group the applications into protected and unprotected groups and only the protected applications are allowed to use the mapping table and randomization. While such Table-Based Randomization may be feasible for L1 cache, the size of the mapping tables becomes impractically large for the LLC, as the number of entries in the mapping table increases linearly with the number of cache lines and the number of concurrently running protected applications. Furthermore, the efficacy of prior randomization-based scheme is dependent on the ability of the Operating System (OS) to correctly classify applications into protected and unprotected groups.

Figure 2A:
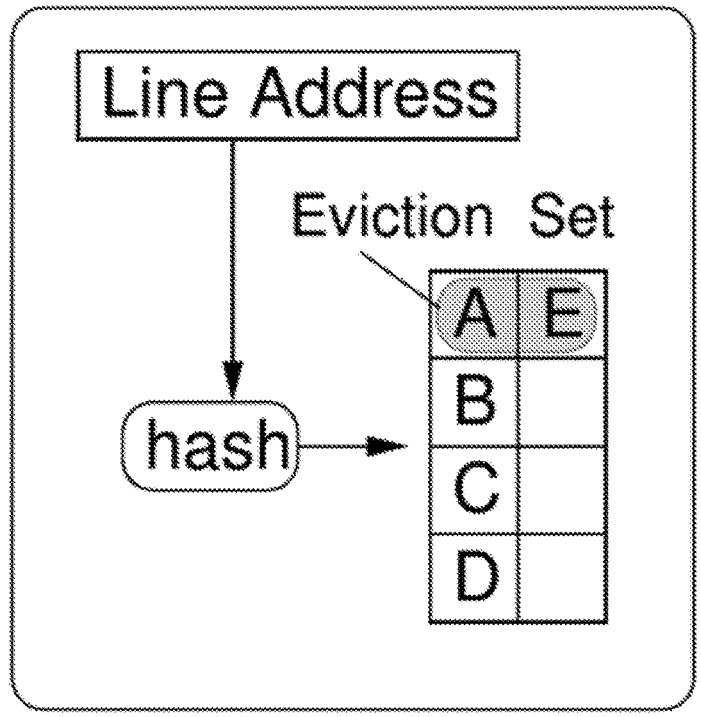
FIG. 2a illustrates an exemplary eviction-based attack used to attack caches according to some embodiments of the present disclosure.
Figure 2B:
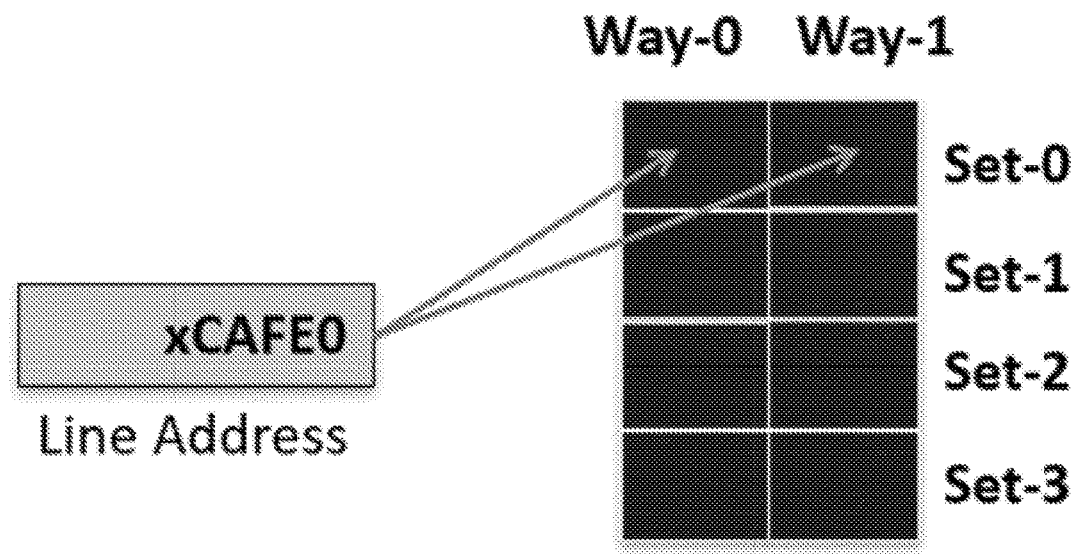
FIG. 2b illustrates an exemplary cache used according to some embodiments of the present disclosure.
Figure 2C:
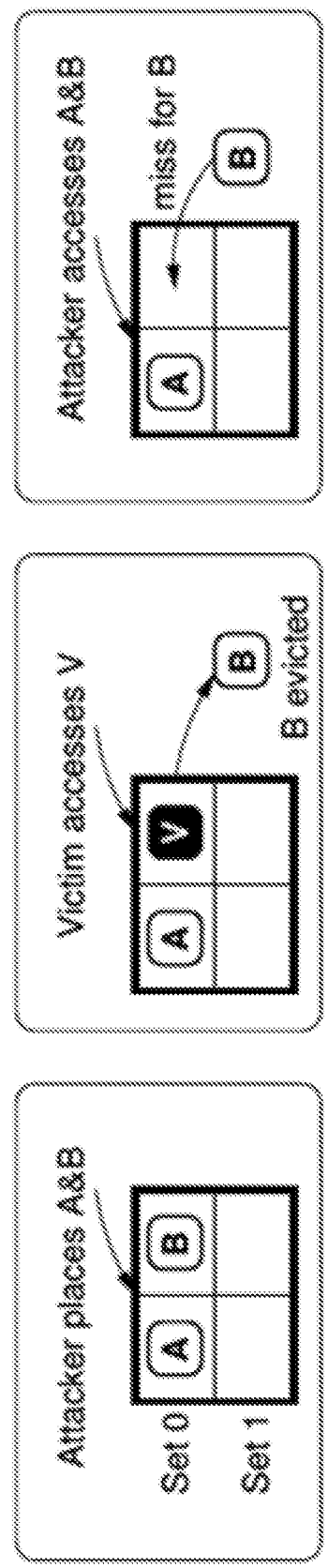
FIG. 2c illustrates an exemplary eviction-based attack used to attack caches according to some embodiments of the present disclosure.

To develop a practical solution against access-based side channels, focus is turned to the set indexing function of the cache, as this function determines the group of lines that get mapped to a given set. To successfully launch an eviction-based attack, the adversary must find lines that map to a given set—the group of lines that map to the same set of the cache and can cause an eviction is called an Eviction Set. The LLC is accessed with a physical line-address (PLA). Conventional LLC designs uses a static hash-function (bottom few bits of the PLA) to determine the set, as shown in FIG. 2a and FIG. 2b, which means an adversary can easily form an eviction set. Even if the hash-function is kept proprietary and not revealed to the users, an adversary can use timing attacks to determine the eviction set for such a design, as shown in FIG. 2c. Once an adversary infers the mapping for one machine, the adversary can use this information to attack all machines that use the same hashing function.

Figure 3:
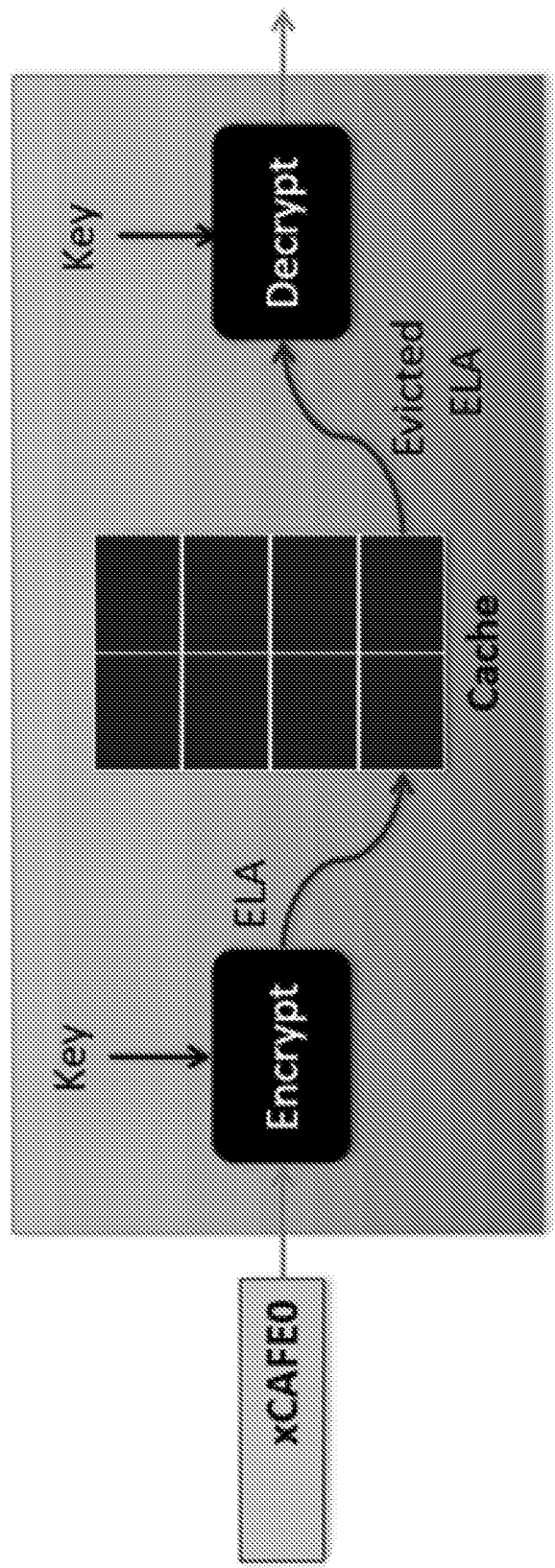
FIG. 3 illustrates an encrypted cache and access method according to some embodiments of the present disclosure.

Embodiments of the present disclosure can provide a key insight that randomized mapping of memory lines to cache locations can be accomplished efficiently by operating the cache on an Encrypted Address Space (EAS) instead of the Physical Address Space (PAS), as shown in FIG. 3. The avalanche effect of encryption would cause lines that have some spatial correlation in the PAS (such as those mapping to the same set of the cache) to get scattered throughout the space in EAS, thus breaking the correlation present in the PAS. This scattering would happen in an unpredictable fashion and would be dictated by the encryption key. For example, lines A and E were mapped to the same set in FIG. 1a, however, in FIG. 3, A and E can be mapped to different sets, and for another key they would get mapped to some other sets. Based on these insights, the presently disclosed technology can provide a Cache operated on Encrypted Address-Space (CEASE).

CEASE can employ a block cipher, such as Low-Latency Block-Cipher (LLBC), to convert the b-bit Physical Line-Address (PLA) into a b-bit Encrypted Line-Address (ELA), and uses this ELA to access the cache. As cache access latency can correlate to system performance, disclosed herein are potential designs for a LLBC that can perform encryption and decryption with low latency. In some embodiments, a four-stage Fiestel-Network can be used in the LLBC that can perform encryption/decryption within 2 cycles, while consuming a storage overhead of ten bytes (for the encryption key). The encryption key of CEASE can be initialized to a random value on every reboot, so the mapping of PLA-to-ELA is different for each machine, and even for the same machine, this mapping changes every time the machine is restarted. When a dirty line is evicted from the cache, CEASE can use the LLBC to perform decryption and convert the ELA of the evicted line to obtain the PLA of the evicted line and uses this PLA to perform the writeback. While the embodiments described herein utilize a LLBC for the conversion of the PLA to ELA, it is to be understood that any method of encryption known to those of ordinary skill in the art can be used, such as block ciphers, stream ciphers, hashing functions, randomization, The PLA-to-ELA mapping of CEASE can be dictated by the encryption key, and for a given key, this mapping can remain constant. Given enough time, however, an adversary can still launch a timing-based attack to determine which group of lines map to the same set. CEASE can be made resilient against such attacks by periodically changing the keys and performing dynamic remapping of the cache lines based on the new key. At a first time, the LLBC can have a first key, and uses a particular mapping. Over time, a second key can be used to remap the contents of the cache and when the conversion finishes the key is updated to the second key. Such an embodiment can provide a variant of CEASE that performs dynamic remapping, referred to herein as CEASE with Remapping (CEASER). Also discussed herein is rate at which remapping must be performed in CEASER.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

Figure 4:
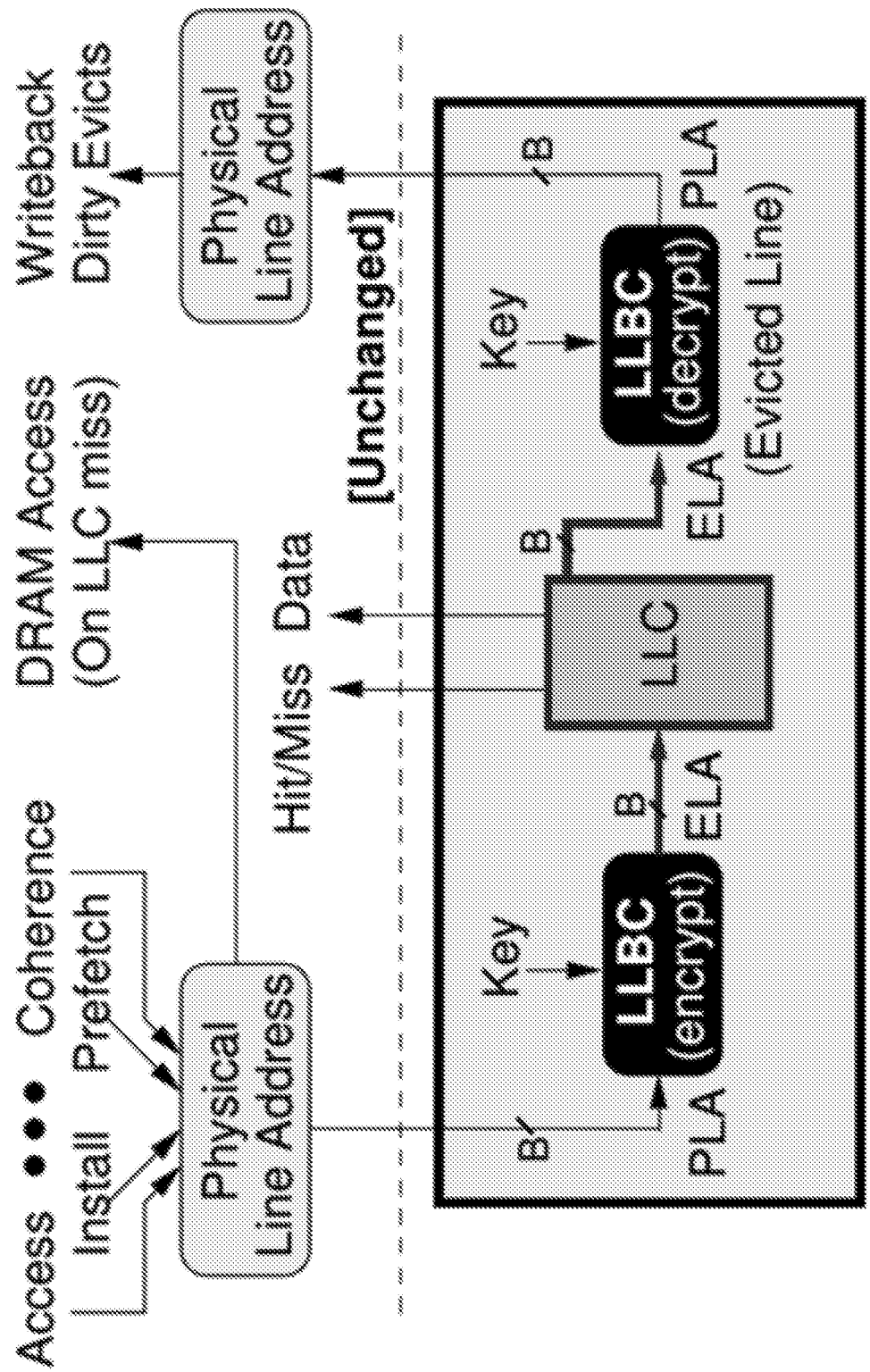
FIG. 4 illustrates an encrypted cache and access method according to some embodiments of the present disclosure.

FIG. 4 provides an overview of an exemplary embodiment of CEASE. Similar to a conventional cache, CEASE can be accessed using the Physical Line-Address (PLA). CEASE can use a Low-Latency Block-Cipher (LLBC) to convert the b-bit PLA into a b-bit Encrypted Line-Address (ELA), and can then use this ELA to access the cache. With CEASE, the cache organization and hit/miss detection can remain unchanged, in some embodiments; but instead of receiving an access for a physical line-address A (which may get mapped to some Set X), the cache can receive an access for an encrypted line address B (which may get mapped to a different Set Y). Internally, the tag-store entry of the cache can continue to have the usual metadata such as valid bit, dirty bit, replacement state, coherence bits, the tag, and the like. The tag-store and the data-store of the cache can remain unchanged. Additionally, the entry of the cache can also have replacement metadata, in some embodiments, such as least-recently-used (LRU) state, re-reference interval prediction (RRIP) state, frequency counter state, first-in-first-out (FIFO) state, and the like.

If the accessed PLA is present in the cache, the cache can indicate a hit and provide the data. On a miss, the cache may evict a dirty line, and this line can be written back to the memory. As the tag information in the cache is based on the encrypted line address, the line can first be converted into the original physical line address. Fortunately, the same LLBC circuit (with minor changes) can be used to perform decryption and convert the ELA to PLA. As the evicted line now has the original physical address, the line can be written to back to memory without the memory needing to know about the ELA.

Thus, the encrypted address (ELA) can be visible only to (and is present within) the LLC. The rest of the system can remain oblivious to the presence of the ELA and continue to operate in a traditional manner using the PLA. Thus, coherence requests, store requests, prefetch requests, and the like all can continue to access the cache with only the PLA and without being aware of the ELA. CEASE can internally convert the PLA to ELA to access the cache and can subsequently re-convert the ELA to the PLA while interacting with the external systems or components (such as on writebacks to memory).

Embodiments of the present disclosure can provide block ciphers for creating a one-to-one mapping from a B-bit plain text to B-bit cipher text. The number of bits to encrypt (the line address) in some embodiments disclosed herein are usually quite small. For example, for a system with 46-bit physical address space, the line-address is only 40 bits. Therefore, a 40-bit block cipher can efficiently convert a 40-bit PLA into a 40-bit ELA. The commonly used encryption algorithms, such as AES, operate at 128-bit to 256-bit granularity, and incur a latency of tens of cycles. For a last level cache, the latency of access is still important, so it is desirable to have a block-cipher that operates at low-width, is secure, and does not incur significant latency. The usage of a block cipher herein is different from standard block ciphers in that an adversary has no direct visibility to the ciphertext, so the adversary cannot launch known plaintext attacks, which tends to be the biggest weakness of small-width block ciphers. For example, a small-width block cipher (such as DES, which operates on 64-bits) is not usually considered insecure because an adversary can memorize the input/output pairs and launch a known plaintext attack. Therefore, most secure designs of block ciphers (such as AES) have moved to a 128-bit or 256-bit blocks. Fortunately, in the embodiments disclosed herein, the encrypted line-address is not visible to the adversary, so known plaintext attacks are not a concern, and small-width block ciphers can be used. With a zero-cycle latency overhead, the performance loss of CEASE can be reduced to about 0.5%, whereas with a 4-cycle latency, the performance loss can be about 1.75%. Thus, the performance overhead can still be reduced with even lower latency implementations of block ciphers.

One popular method to build block ciphers is the Feistel-Network. Feistel-Networks are simple to implement, incur low-latency, and are widely used in encryption algorithms, such as the Data Encryption Standard (DES) and BlowFish encryption. The Feistel-Network has been studied extensively and theoretical work has shown that for well-chosen round functions, having 3 stages is sufficient to make the block cipher a pseudo-random permutation, while 4 stages are sufficient to make it a strong pseudo-random permutation. In some embodiments, a four-stage Fiestel-Network can be used.

Figure 5A:
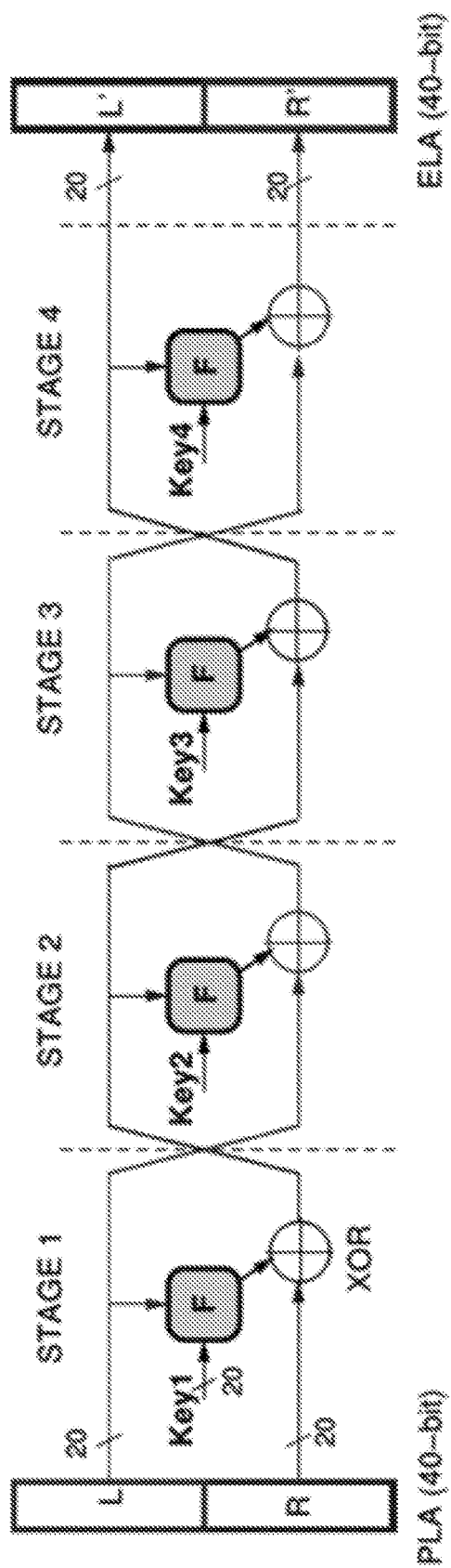
FIG. 5a illustrates an exemplary low-latency block-cipher used to encrypt caches according to some embodiments of the present disclosure.
Figure 5B:
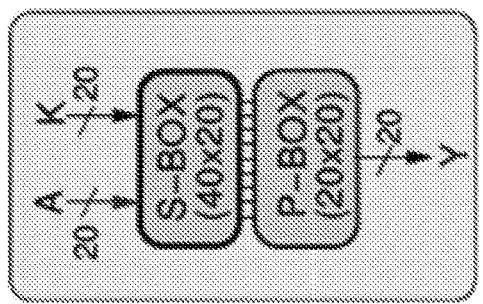
FIG. 5b illustrates an exemplary function used in a low-latency block-cipher used to encrypt caches according to some embodiments of the present disclosure.

FIG. 5a shows the logic for an exemplary four-stage Feistel-Network operating on a 40-bit line-address according to some embodiments of the present disclosure. Each stage can split the 40-bit input into two parts (L and R) and can have an output which is split into two as well (L' and R'). R' can be equal to L. L' can be computed using an XOR operation on R and the output of a Round Function (F), shown in FIG. 5b, which can accept L and a randomly chosen key (K). Each stage can have a 20-bit key, which means the network can have one 80-bit key (one quarter for each stage).

In some embodiments, the round function (F) of the Fiestel-Network need not be invertible. For the round function (F), a substitution-permutation network (SPN) can be used that can provide obfuscation with low-latency and zero storage overheads. For example, a non-programmable SPN can be used that is configured randomly for each stage at the design time. The S-box in such an embodiment can have a 40-bit input and a 20-bit output block that are configured randomly. FIG. 6a and FIG. 6b show the logical representation of the S-Box (for 4-bit input and 2-bit output) and the storage-free physical implementation. The P-Box is simply a wire box that can route one-bit of the input to one of the bits of the output, as shown in FIG. 6c and FIG. 6d, for 4-bit input and 4-bit output. The P-Box does may not incur any latency due to logic operations.

Computing each bit of the SPN can incur a delay of 6 two-input XOR gates, which means that each stage of the Fiestel-Network can have a delay of 7 XOR gates. Thus, for four-stages, the critical path delay can be 28 XOR gates, which can be computed within two clock cycles of even an aggressively pipelined processor (typically the clock cycle of modern processors is designed to perform 15-20 gate operations). The total storage for the proposed LLBC design can be 80-bits (for the keys).

As discussed, embodiments of CEASE can form eviction sets at boot time and can remain static throughout, making it possible for an adversary to learn the eviction sets. If the lines that form the eviction sets are changed periodically, it can make it much more difficult for an adversary to learn the eviction sets. In some embodiments, CEASE can use Dynamic-Remapping (CEASER), which can accomplish this by periodically changing the key and remapping the lines based on the new key.

Figure 8A:
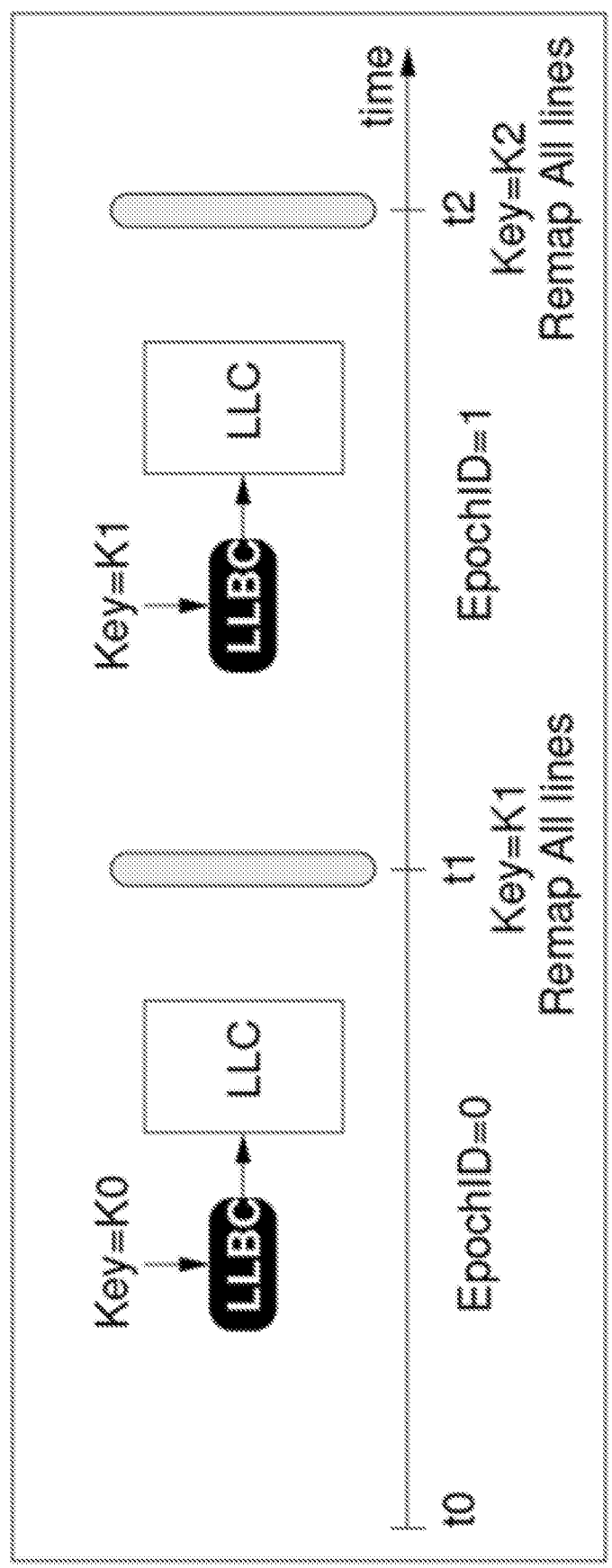
FIG. 8a illustrates an exemplary method for bulk remapping of an encrypted cache according to some embodiments of the present disclosure.
Figure 8B:
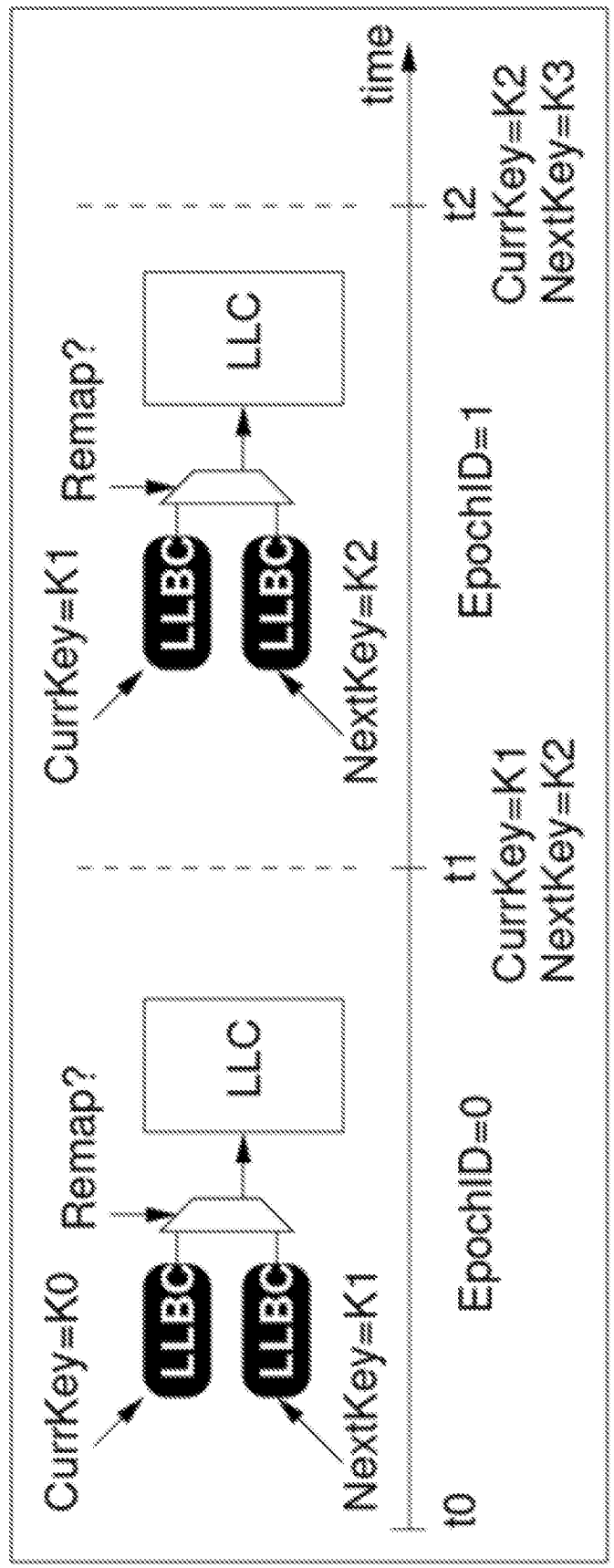
FIG. 8b illustrates an exemplary method for dynamically remapping an encrypted cache according to some embodiments of the present disclosure.

In some embodiments, CEASER can divide the time into epochs wherein each epoch has its own key that is set to a random value. In each epoch, CEASER can use the key of the epoch to perform encryption and decryption. FIG. 8a and FIG. 8b describe two exemplary embodiments of CEASER: bulk-remapping (FIG. 8a) and gradual-remapping (FIG. 8b). In bulk-remapping, at the end of the epoch, the keys can be changed, and all of the cache lines can be remapped using the second key. In some embodiments, to perform remapping, the line can be read, the encrypted line address can be converted into a physical address with the first key, and the physical address can be re-encrypted with the second key and installed (i.e. placed) in the cache. Such an embodiment can provide for simultaneous remapping of all of the lines.

In some embodiments, the cache can be gradually remapped during the entire period using the second key (NextKey) corresponding to the second epoch. By the time the epoch ends, all the lines in the cache can be remapped using the NextKey, so no additional remapping is required at the end of the epoch. At the end of the epoch, the first key (CurrKey) can be overwritten by the second key, and a new second key (NextKey) can be initialized to a random value. On each access, the incoming PLA can be translated into an ELA using both the CurrKey and NextKey, and the appropriate one can be chosen depending on whether that line has already been remapped using the NextKey. As the gradual remap spreads the remapping throughout the epoch, it is a more practical.

Figure 7:
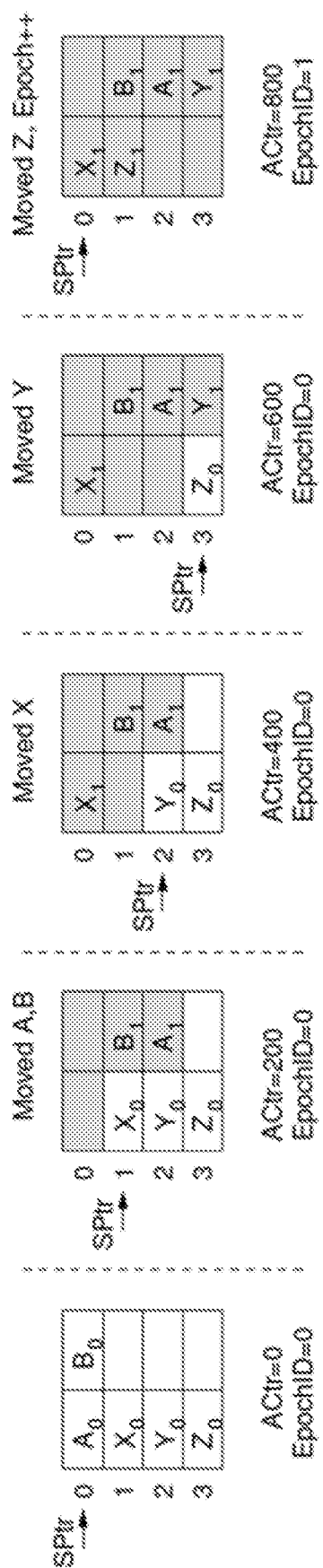
FIG. 7 illustrates an exemplary method for dynamically remapping an encrypted cache according to some embodiments of the present disclosure.

The rate of remapping of CEASER can be regulated by a parameter Accesses-Per-Line-Remap (APLR). For practical reasons, CEASER can perform remapping of all lines in the set at any given time. So, if APLR=K, CEASER can remap one set containing W ways every W*K accesses. The entire cache containing N lines can be remapped after K*N accesses, which can also be the epoch period. To perform remapping, CEASER can be equipped with two registers: a Set-Relocation Pointer (SPtr) and an Access-Counter (ACtr). The SPtr can keep track of which set in the cache should be remapped next. ACtr can be incremented on each access to the cache and can determine when to trigger the next remap. FIG. 7 shows an example of a gradual remapping for a cache containing 4 sets (0-3). For simplicity, there are five lines shown as resident in the cache (A, B, X, Y, Z). The subscript with the line denotes the encrypted address of the line based on the EpochID (so, $A_0$ is encrypted address of A with key of EpochID=0, and $A_1$ is encrypted address of A based on the key of EpochID=1, and so on). The cache begins with SPtr=0, ACtr=0, and EpochID=0, as shown. We assume CEASER is set to remap one line every 100 accesses in FIG. 7, so one set of the two-way cache will get remapped every 200 accesses to the cache. However, it is understood that CEASER can be set to remap one line after any predetermined threshold for number of accesses. Such a rate was chosen for the exemplary embodiment of FIG. 7 as it is sufficient to provide strong security while incurring negligible slowdown (about 1%). Other systems with lower APLR increase the slowdown from CEASER from 1.1% to 1.2% if the APLR is reduced from 100 to 25. Thus, the APLR can be increased by 4× and still have negligible slowdown.

After 200 accesses to the cache (ACtr=200), the lines resident in Set 0 ($A_0$, and $B_0$) can be remapped. CEASER can perform decryption of the line address ($A_0$ to A) using the first key (CurrKey), re-encrypt the line with the second key (NextKey) of the second epoch (A to $A_1$), and install this line ($A_1$) in the cache using the regular replacement policy. $A_1$ goes to Set 2 and $B_1$ goes to Set 1. The SPtr can then be incremented, as shown.

After another 200 accesses (ACtr=400), Set 1 can undergo relocation. Note that only $X_0$ needs to be relocated and not $B_1$, as $B_1$ already corresponds to the second epoch. After remapping, $X_1$ can be relocated to Set 0, as shown.

After another 200 accesses (ACtr=600), Set 2 can undergo relocation and line $Y_0$ can be remapped, as shown. After another 200 accesses (ACtr=800), Set 3 can undergo relocation and line Zo can be relocated to, for instance, Set 1 after getting remapped with the second key. Note that at this point the entire cache has undergone remapping and now contains lines that belong only to the second epoch. When this happens, the EpochID can be incremented, SPtr and ACtr can be reset, the first key (CurrKey) can be overwritten by the second key (NextKey), and a new second key (NextKey) can be set to a random value. The process can then repeat.

With gradual mapping, lines from two different epochs (first and second) can co-reside in the cache at any given time. Therefore, the encrypted line address can be identified with the EpochID (EID) with which the line was remapped. Otherwise, two lines in a set can end up having the same encrypted address, one for the current epoch and one for the next epoch. For example, in FIG. 7, if $A_1$ equals $Y_0$, and $Y_0$ has not been remapped yet, there can exist two lines with identical encrypted address. However, if the EID is also with each cache line, the system can identify precisely which encrypted address belongs to which line. In some embodiments, only two EpochIDs can be valid at any given time (current or next), so only one-bit (EID) is needed to accurately identify the EpochID of the line.

In the exemplary embodiments described above, a default value of APLR=100 was used, which means the remapping overhead is limited to 1% (on average, one line gets remapped per 100 accesses). Such a rate of remapping is sufficient to tolerate 30 years of continuous attack; however, other rates of remapping can be used.

Also described above is a gradual remapping of the LLC using a predetermined threshold to trigger the remapping. In some embodiments, however, the remapping can occur randomly. For example, a random number generator can be implemented to generate a random number on each access, and if the generated random number is a certain value, the accessed set can be remapped. Such an embodiment can provide for a random remapping of the LLC.

Additionally, the exemplary embodiments described above implement a gradual remapping at the set granularity (i.e., an entire set is remapped once ACtr increases past the predetermined threshold); however, in some embodiments, the gradual remapping can occur at other granularities, such as line granularity, way granularity, bank granularity, or cache granularity. For example, if ACtr increases past 800, then the entire bank shown in FIG. 7 can undergo relocation and the EpochID can be increased. Some processor designs use a banked LLC, where the banks are connected via a ring, and access to different banks have different latencies, and an adversary can exploit this timing differences to determine the line-to-bank mapping and focus the attack on one bank. In a bank-agnostic implementation of CEASER, CEASER can determine the line-to-bank mapping based on the encryption key. However, if a user desires the flexibility to regulate the line-to-bank mapping, then CEASER can still be implemented at a per-bank granularity, with each bank having its own remapping circuit. In both the bank-agnostic and bank-aware implementations of CEASER, the effective size of the cache under attack can be reduced to one bank. For example, banking would degenerate an 8 MB LLC into a 1 MB LLC for an attacker. Fortunately, for a 1 MB 16-way cache, CEASER can remap one line every 126 accesses to maintain the same level of security. So, the described exemplary method of remapping one line every 100 accesses can still be sufficient to provide strong security for the banked design.

Figure 9:
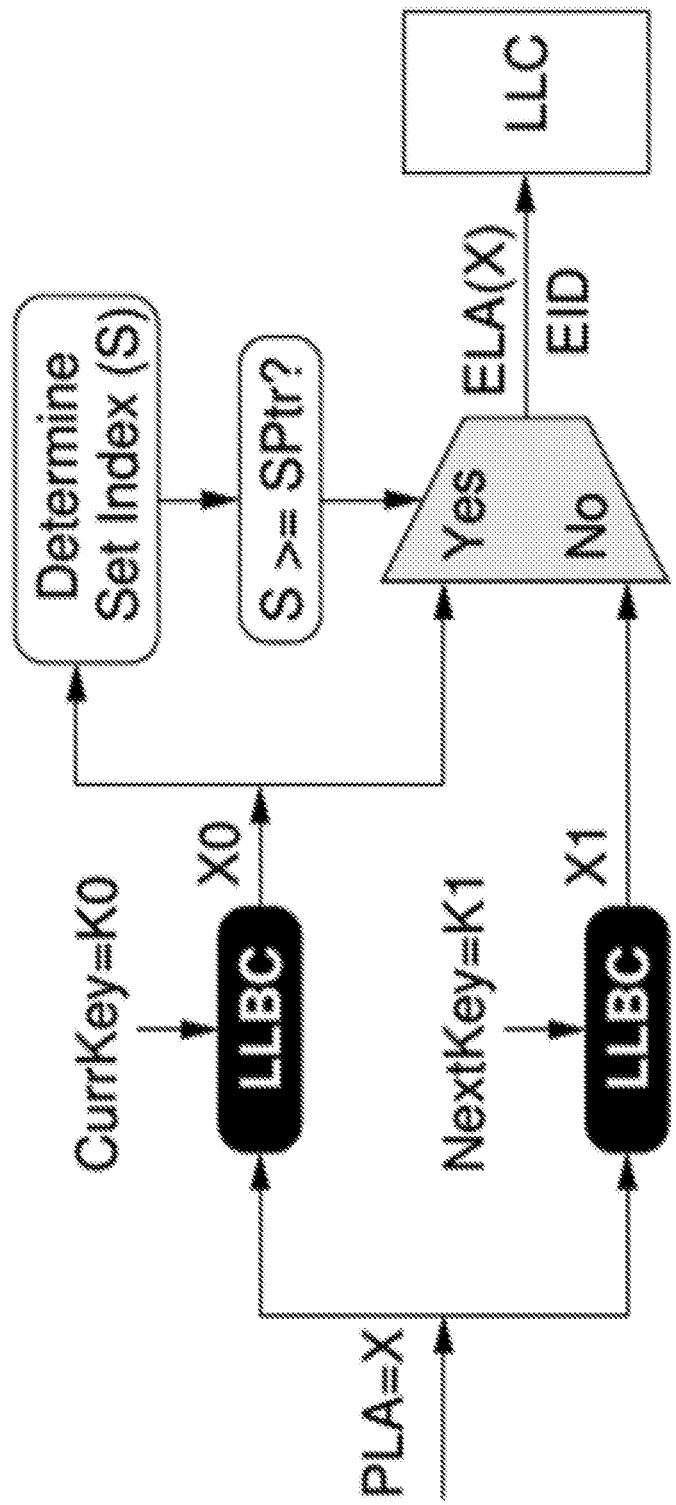
FIG. 9 illustrates a dynamically remapped cache and access method according to some embodiments of the present disclosure.

On an access to the LLC, the system may not know if the line has been already remapped during the current epoch or not. However, the system can determine this by first performing the encryption using the first key (CurrKey) and checking if the set index of the line maps to a set that is yet to undergo remapping (i.e., if the set index is greater than or equal to SPtr). If so, the first key (Currkey) can be used; otherwise, the mapping using the second key (NextKey) can be used, as shown in FIG. 9. Once the encrypted address and the corresponding EpochID (first or second) is available, the cache access/install can proceed in the normal manner—with the tag match on the encrypted line address (plus the EID).

Figure 10A:
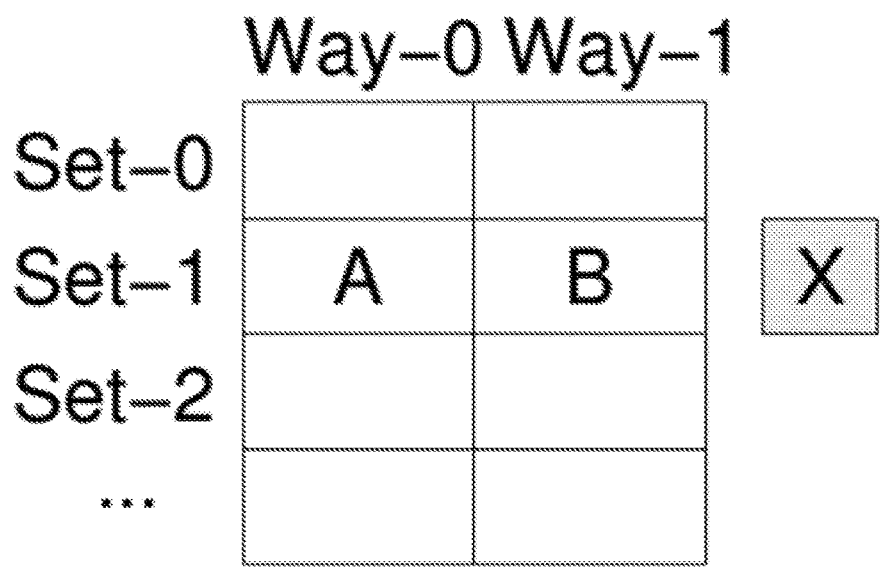
FIG. 10a illustrates an exemplary cache used according to some embodiments of the present disclosure.
Figure 10B:
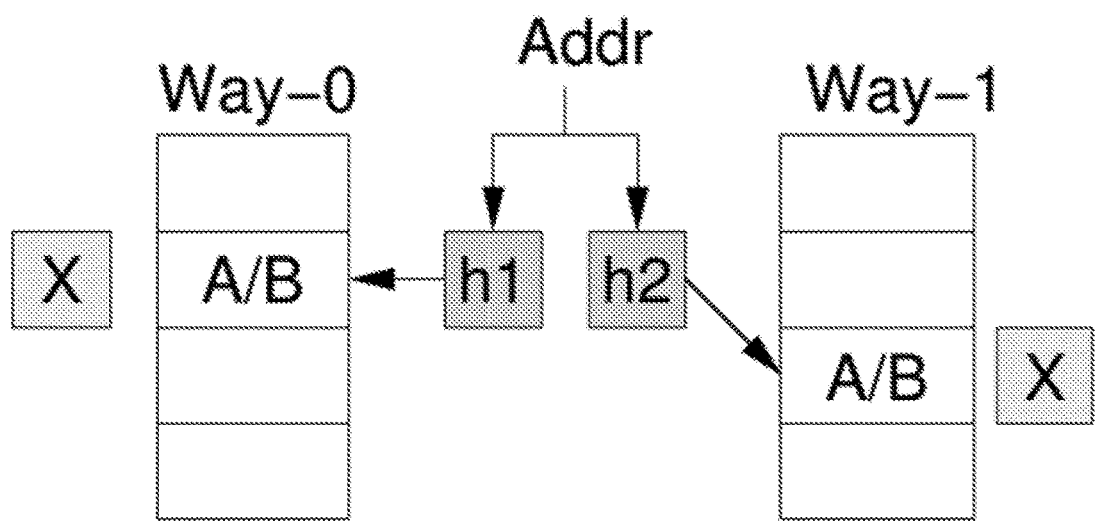
FIG. 10b illustrates an exemplary partitioned cache and access method according to some embodiments of the present disclosure.

In a conventional set-associative cache, each way of the cache can use the same function to hash the line address to the set. CEASER is built on top of a set-associative cache, therefore, it suffers from the same limitation, in that all the ways of the cache use the same indexing function to map the encrypted line to the set of CEASER. In a skewed-associative cache, each way of the cache uses a different hashing function, so a given line can map to different sets in different ways. For example, as shown in FIG. 10b, the skewed cache uses two hashing functions to index the respective ways of the cache. A given line X could be located in Set-1 for Way-0 but Set-2 for Way-1, based on the different hashing functions. While a skewed-cache reduces conflict misses when the cache has lower associativity, its effectiveness reduces when the cache is highly associative. Therefore, modern designs of highly-associative LLCs typically do not opt for a skewed organization. For example, implementing a baseline 8 MB 16-way LLC as a skewed-associative cache provides less than 0.1% speedup.

While a skewed-cache has negligible impact on performance of a highly associative cache, they provide an important property—each line can be resident in multiple possible sets, therefore the groups of lines with which the given line may conflict keep changing depending on the way in which the line is resident. This property has important security implications, as it will make it much harder for the adversary to form an eviction set, as the eviction set depends on the way in which the line is resident. FIG. 10a and FIG. 10b show the eviction set for the target line "X" for a set-associative cache and a skewed-associative cache, respectively.

Let there be S sets in the cache, as shown. To evict the target line X from the two-way set associative cache, an adversary needs two lines (A and B) such that they map to the same set as X. Two random lines, A and B, form an eviction set for X. The probability that two random lines A and B map to the same set as X is $1/S^2$. Therefore, the probability that X can be dislodged with two random lines in a set-associative cache is $1/S^2$.

For the skewed-cache two random lines, A and B, form an eviction set with X. However, to be able to guarantee that line X is evicted from the skewed cache, an adversary needs the two lines A and B such that they can dislodge X from both possible locations. The probability that A and B map to the same set in Way-0 and Way-1 as line X is $1/S^4$. Thus, skewed-cache can offer $S^2$ resilience in robustness compared to the set-associative implementation. Given that modern LLCs have thousand(s) of sets, this represents several orders of magnitude improvement in robustness. In some embodiments, the principles of a skewed-cache and CEASER can be combined to form a robust and practical design, called Skewed-CEASER (CEASER-S), while obviating the need for defining unpredictable and dynamic hash functions.

Similar to a skewed-cache, CEASER-S can allow each line to get mapped to different sets, depending on the way in which the line is resident. However, unlike a skewed-cache, CEASER-S can use multiple instances of CEASER instead of hashing functions to determine the set mappings. CEASER-S can divide the cache ways into multiple partitions and can use a different set of encryption keys for each partition. Therefore, any given line can be mapped to a different set in each partition. An exemplary embodiment of CEASER-S can contain two partitions, whereas, the system can be generalized into P partitions (each containing W/P ways) and is denoted as CEASER-SP. For example, a CEASER-S design with four partitions can be denoted as CEASER-S4. Note that CEASER-S1 would be the same as the original CEASER design, so therefore CEASER-S as used herein is indicative of CEASER-S2 (having two partitions). For simplicity, exemplary embodiments of the organization of CEASER-S can have two partitions. The baseline set-associative cache can have S sets and W ways. CEASER-S would logically split the cache into two halves: Left and Right, each containing S sets and W/2 ways. Each half can implement CEASER with different sets of encryption keys, therefore, a given line will map to a different set in each partition.

Figure 11:
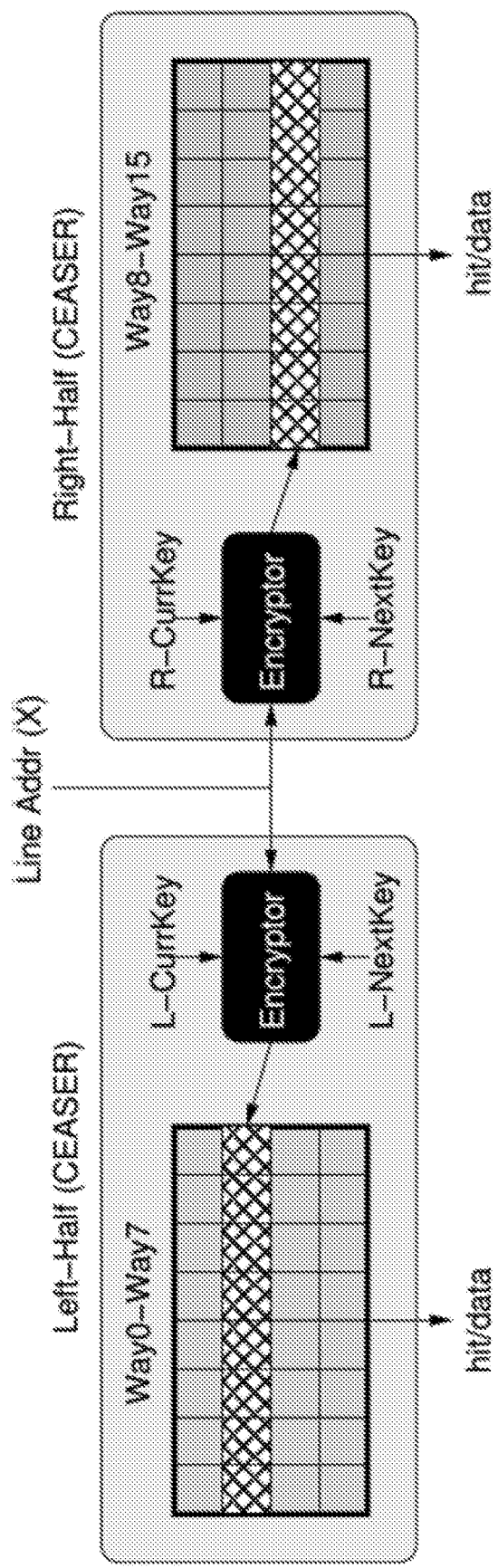
FIG. 11 illustrates an exemplary partitioned cache and access method according to some embodiments of the present disclosure.

FIG. 11 shows an overview of an exemplary embodiment of CEASER-S. As shown, the 16-way baseline cache can be split into two 8-way caches, and CEASER can be implemented in each half using an independent set of keys. Note that an implementation of CEASER with gradual mapping can use two keys (i.e., the first and the second keys, CurrKey and NextKey). The left half can use keys L-CurrKey and L-NextKey, and the right can use R-CurrKey and R-NextKey. On an access to a convention cache, all of the W-ways of the cache can be checked for a hit. In CEASER-S, the W/2 ways in each of the left-half and the right-half can be checked concurrently (so the number of checks remains the same as the baseline W-way cache). If there is a hit in either half, the cache can return the data from the line that had the hit and can update the replacement state. On a miss, CEASER-S can randomly pick the half in which to install the line. As each half has eight ways, the victim can be decided by the replacement policy (LRU, RRIP, SHiP etc.)

of the chosen half. For controlling the remapping of CEASER-S, the same parameter, Remap-Rate (R), can be used and can perform remapping at a set granularity. With the default Remap-Rate of 1% and a 16-way cache, after 1600 accesses, one set can be remapped in each half.

For example, the security for the default implementation of CEASER-S with two partitions can be determined (it is noted that CEASER-S can be more robust in some embodiments with more partitions). CEASER-S can be robust against any search algorithm and replacement policy. For an adversary to repeatedly evict a given address with W conflicting lines, the adversary needs to find W lines such that they conflict with the target address in both the Left-Cache and Right-Cache of CEASER-S (if the line conflicts in only one half, then half of such lines are expected to get mapped to a non-conflicting set in the other half and will not participate in evictions). Such a line that conflicts on both locations can be designated as a hard-conflict line. If the cache has S sets, the probability that a random line will have a hard conflict can be illustrated b Equation 1.

$$P = Prob(HardConflict) = \frac{1}{S^2} \quad (1)$$

Given a Remap-Rate of R and a cache containing N lines, the epoch (E) of CEASER-S can be found with Equation 2.

$$EpochPeriod(E) = \frac{N}{R} \quad (2)$$

All lines can undergo remapping within the time period equal to one Epoch. Therefore, E can bound the available time for the attacker to converge on at least W lines that have a hard conflict. The probability that there are W or more hard-conflict lines in E accesses can be given by a binomial distribution as shown in Equation 3.

$$Prob(\geq W \text{ in } E) = 1 - \sum_{k=0}^{k=(W-1)} \binom{E}{k} \cdot P^k \cdot (1-P)^{E-k} \quad (3)$$

To derive the time for a successful attack, three assumptions can be made: (1) it is sufficient to simply have W hard conflicts in the attack pattern, without needing to identify which lines are hard conflicts (an idealized search algorithm); (2) no other application accesses the cache during the epoch period (otherwise, the attacker can only do a reduced fraction of the accesses in the epoch); and (3) the attacker has enough time to not only form an eviction set but also to attack the victim (if most of the epoch goes in forming an eviction set, it would leave little time to attack).

Even when an attacker succeeds in forming an eviction set, this vulnerability can be removed when the lines get remapped. Given that it takes a few milliseconds to remap the entire cache and the attacker is forced to spend most of the time in learning the eviction set, the window of vulnerability is quite small (1 millisecond or less). Table 1 shows the time for a successful attack, as the Remap-Rate of CEASER-S is varied from 1% (default) to 0.1%. This analysis is performed for both the baseline 8 MB cache and a 1 MB bank (attacker focuses on one bank, CEASER-S implemented per bank).

TABLE 1

Vulnerability of CEASER-S

| Remap-Rate (R) | 8 MB LLC | 1 MB Bank of LLC |
| --- | --- | --- |
| 1% (default) | 1 ms every 100+ years | 1 ms every 18 years |
| 0.5% | 1 ms every 100+ years | 1 ms every day |
| 0.1% | 1 ms every 68 years | 1 ms every second |

Thus, even under the severely conservative assumptions, and the default Remap-Rate of 1%, CEASER-S can tolerate years of continuous attacks (providing a vulnerability of, for example, approximately 1 millisecond every 18 years). Note that CEASER-S provides two degrees of freedom—the robustness of CEASER-S can be enhanced even further by increasing the Remap-Rate, the number of partitions, or both.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Figure 12:
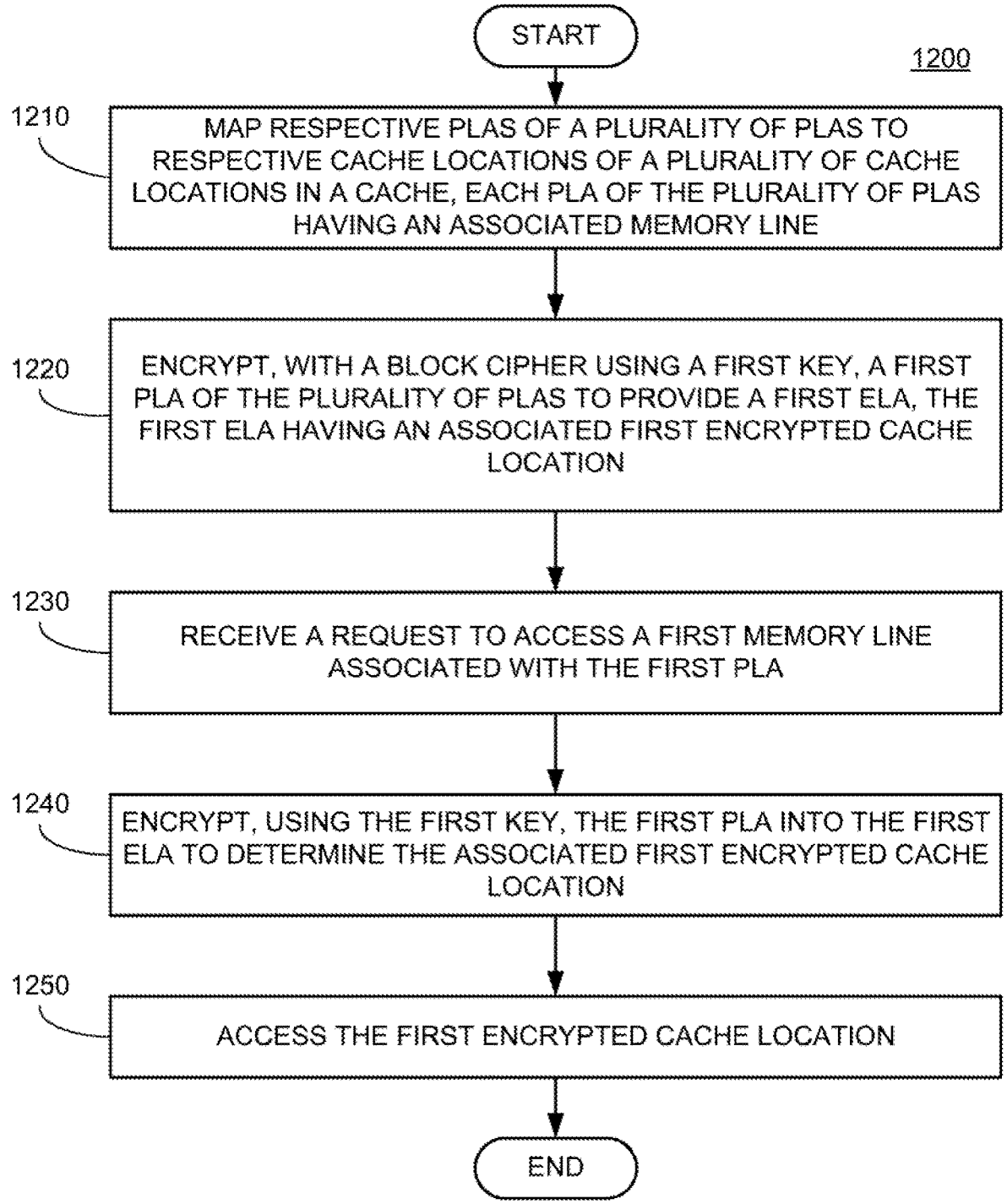
FIG. 12 illustrates a flowchart of a method of accessing a cache according to some embodiments of the present disclosure.

FIG. 12 illustrates an exemplary method 1200 of accessing a cache according to some embodiments discussed above. As shown in block 1210, respective PLAs of a plurality of PLAs can be mapped to respective cache locations of a plurality of cache locations in a cache. Each PLA of the plurality of PLAs can have an associated memory line. Such an embodiment can create a one-to-one correlation of physical line addresses to memory lines. In some embodiments, method 1200 can then proceed to block 1220.

In block 1220, a first PLA of the plurality of PLAs can be encrypted to provide a first ELA, the first ELA having an associated first encrypted cache location. In other words, each memory line can have an encrypted line address and a physical line address. The PLAs can be encrypted using, for example, a low-latency block cipher with a first key, as discussed above. Other methods of encryption can be used to give each cache location an encrypted line address. In some embodiments, method 1200 can then proceed to block 1230.

In block 1230, a request can be received to access a first memory line associated with the first PLA. The request can come from different components, such as a memory, one or more processors, an operating system, a program, and the like. In some embodiments, method 1200 can then proceed to block 1240.

In block 1240, the first physical line address can be converted to a first encrypted line address associated with the first encrypted cache location using the first key. As one of skill in the art would appreciate, using the first key to convert the first physical line address can result in producing the corresponding encrypted line address. In other words, the first physical line address can be "translated" into the first encrypted line address. Such an embodiment can provide for efficient and simple translation between the physical address space and the encrypted address space. In some embodiments, method 1200 can then proceed to block 1250.

In block 1250, the first encrypted cache location can be accessed at the first encrypted line address. The accessing can comprise many actions to be performed on the first cache location, such as retrieving data, writing data, evicting a dirty line, retrieving instructions, and the like. If data or instructions are retrieved from the first cache location upon accessing, the data or instructions can be sent (or transmitted) to other components, such as such as a memory, one or more processors, an operating system, a program, and the like. In some embodiments, method 1200 can terminate after block 1250; however, in other embodiments, method 1200 can proceed to other method steps not pictured.

Figure 13:
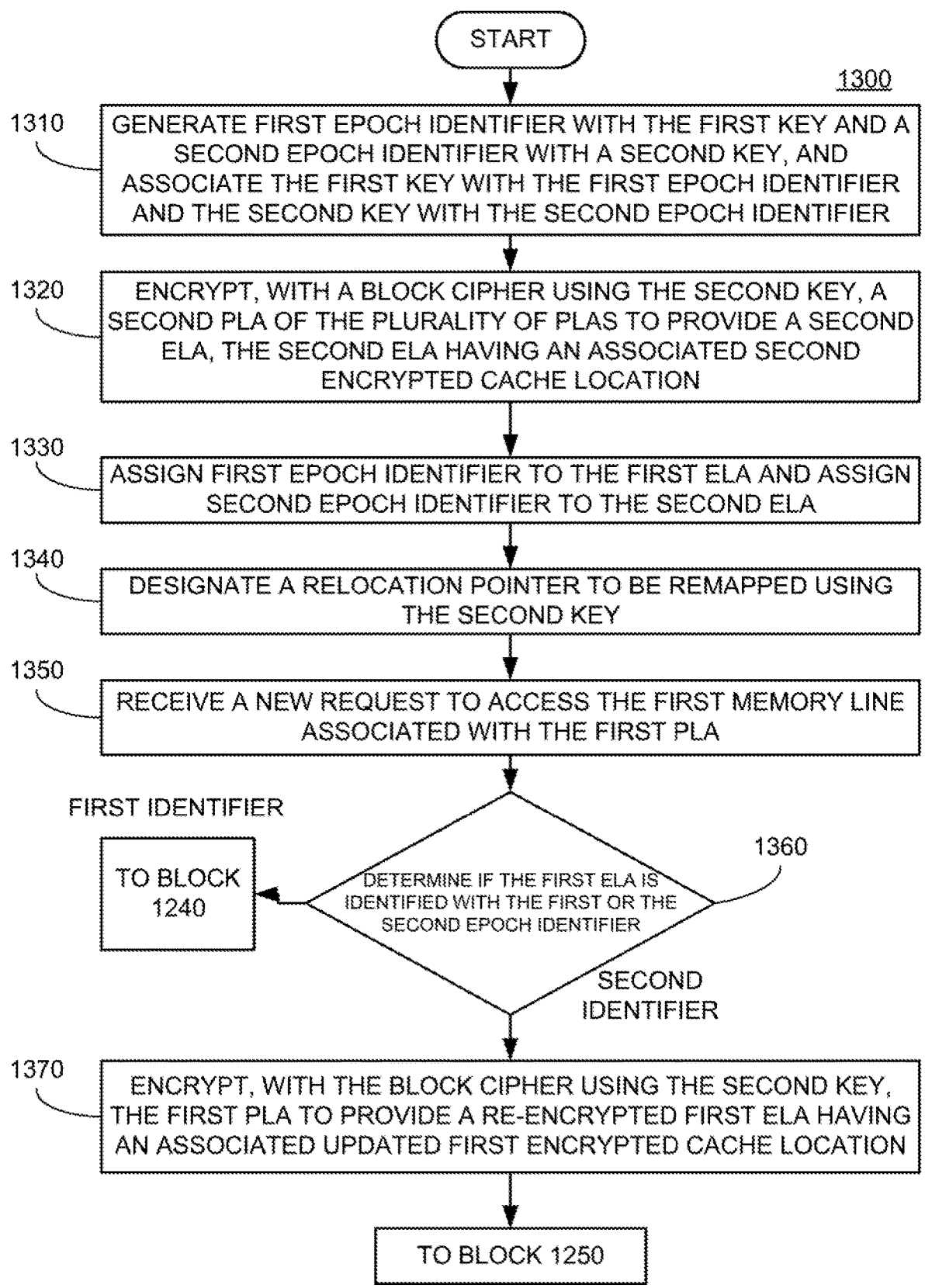
FIG. 13 illustrates a flowchart of a method of accessing a cache according to some embodiments of the present disclosure.

FIG. 13 illustrates an exemplary method 1300 of accessing a cache according to some embodiments discussed above. As shown in block 1310, a first epoch identifier and a second epoch identifier can be generated and associated with a first key and a second key, respectively. The first epoch identifier can be assigned to any cache locations encrypted using the first key. As would be appreciated by one of ordinary skill in the art, such an embodiment would help the system identify with which key to encrypt and/or decrypt the line addresses. As such, each of the memory lines can have an encrypted line address and an identifier identifying which key was used to produce the encrypted line address. For example, if a first cache location is encrypted with a first key, the epoch identifier assigned to the first location can be "1," or any other identifier desired by one of skill in the art. In some embodiments, method 1300 can then proceed to block 1320.

In block 1320, a second PLA of the plurality of PLAs can be encrypted to provide a second ELA, the second ELA having an associated first encrypted cache location. In other words, each memory line can have an encrypted line address and a physical line address. The PLAs can be encrypted using, for example, a low-latency block cipher with a first key, as discussed above. Other methods of encryption can be used to give each cache location an encrypted line address. In some embodiments, method 1300 can then proceed to block 1330.

In block 1330, the first epoch identifier can be assigned to the first ELA and the second epoch identifier can be assigned to the second ELA. In some embodiments, method 1300 can then proceed to block 1340.

In block 1340, a relocation pointer can be designated to be remapped using the second key. The relocation pointer can comprise, for example, a cache set, a cache way, a cache bank, the entire cache, and the like. In some embodiments, method 1300 can then proceed to block 1350.

In block 1350, a request can be received to access a first memory line associated with the first PLA. The request can come from different components, such as a memory, one or more processors, an operating system, a program, and the like. In some embodiments, method 1300 can then proceed to block 1360.

In block 1360, it can be determined if the first ELA is identified with the first or the second epoch identifier. If the first ELA is identified with the first epoch identifier, that can indicate that the first key was used to encrypt the first ELA, and method 1300 can proceed to block 1240 of FIG. 12 using the first key. However, if the first ELA is identified with the second epoch identifier, that can indicate that the second key was used to encrypt the first cache location, and method 1300 can then proceed to block 1370.

In block 1370, the first physical line address can be converted to a re-encrypted first encrypted line address associated with an updated first encrypted cache location using the second key. As one of skill in the art would appreciate, using the second key to convert the first physical line address can result in producing the corresponding encrypted line address. In other words, the first physical line address can be "translated" into the first encrypted line address using a translation separate from the other address translated with the first key. Such an embodiment can provide for efficient and simple translation between the physical address space and the encrypted address space. In some embodiments, method 1300 can then proceed to block 1250 in FIG. 12 to perform the accessing and subsequent steps of method 1200. Method 1300 can then terminate or proceed on to other method steps not pictured.

Figure 14:
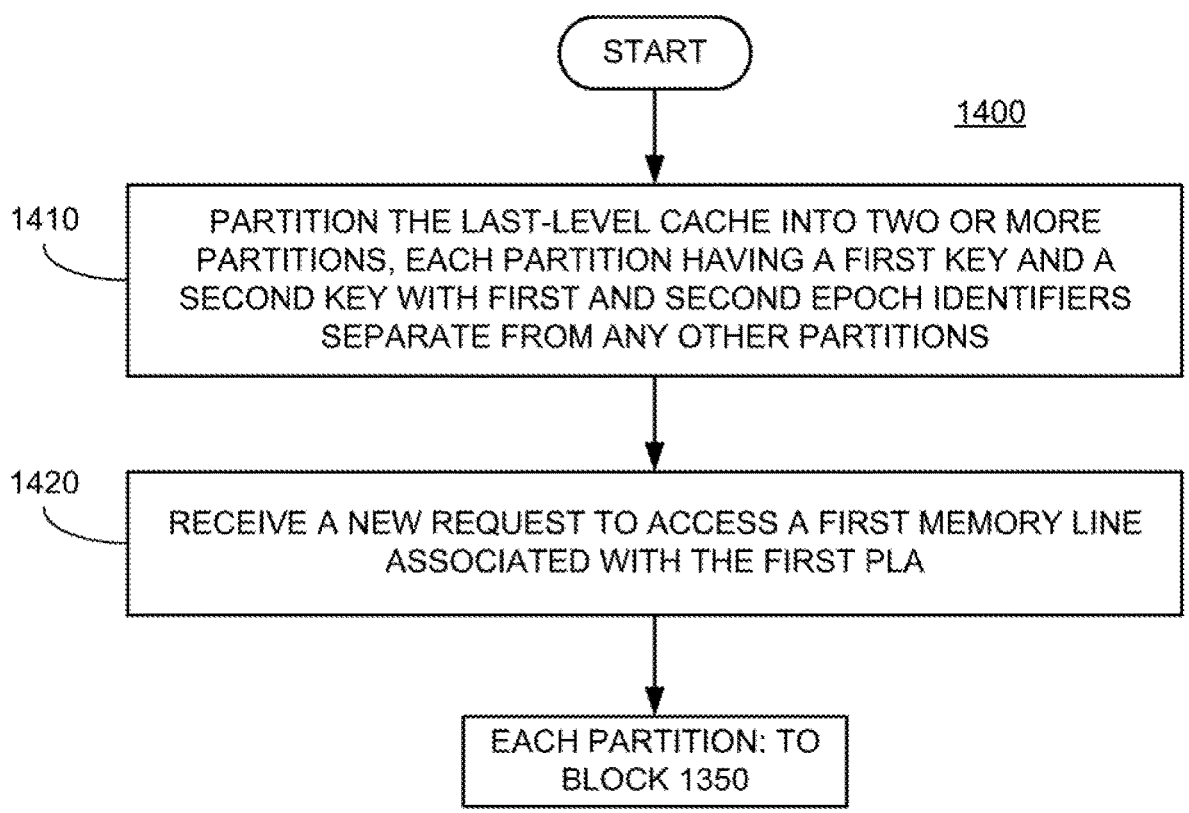
FIG. 14 illustrates a flowchart of a method of accessing a cache according to some embodiments of the present disclosure.

FIG. 14 illustrates an exemplary method 1400 of accessing a cache according to some embodiments discussed above. As shown in block 1410, the last-level cache can be partitioned into two or more partitions, wherein each partition has a first key and a second key (and associated first epoch identifier and second epoch identifier) separate from any other partitions. Such an embodiment can provide improved security, as each partition has its own independent keys and, therefore, encrypted address space. In some embodiments, method 1400 can then proceed to block 1420.

In block 1420, a request can be received by the two or more partitions to access a first cache location at a corresponding first physical line address. The request can come from different components, such as a memory, one or more processors, an operating system, a program, and the like. In some embodiments, each partition can then process the request according to method 1300 as shown in FIG. 13, beginning at block 1350. Each partition of the two or more partitions can undertake the subsequent steps to access the first line address. Method 1400 can then terminate or proceed on to other method steps not pictured.

Certain embodiments and implementations of the disclosed technology are described above with reference to block and flow diagrams of systems and methods according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

EXAMPLES

The following exemplary use cases describe examples of a typical user flow pattern. They are intended solely for explanatory purposes and not limitation.

Example 1

CEASER

A Pin-based x86 simulator was used with a detailed memory model. Table 2 shows the configuration used. The L3 cache was an 8 MB shared cache between all of the cores and incurs a latency of 24 cycles. All caches used a line size of 64 bytes. For CEASER, an encryption latency of 2 cycles and APLR=100 were used.

TABLE 2

Baseline Configuration of CEASER

Processor

| | |
|---|---|
| Core parameters | 8-cores, 3.2 GHz |
| L1 and L2 cache | 32 KB, 256 KB |
| | 8-way (private) |

Last Level Cache

| | |
|---|---|
| L3 (shared) | 8 MB, 16-way, SRRIP, 24 cycles |

DRAM Memory-System

| | |
|---|---|
| Bus frequency | 800 MHz (DDR 1.6 GHz) |
| Channels | 2 (8-Banks each, |
| tCAS-tRCD- | 2 KB row buffers) |
| tRP-tRAS | 9-9-9-36 |

A diverse set of workloads was used, including all of the 29 workloads from a SPEC2006 benchmarks suite and 5 workloads from a GAP benchmark suite. For each benchmark, a representative slice of 1 billion instructions was taken and analyzed. The 34 benchmarks were run in rate-mode, where each core ran a copy of the benchmarks. Additionally, 100 mixes formed randomly from these 34 benchmarks were measured.

Timing simulation was performed until all benchmarks in the workload finished executing a minimum of 1 billion instructions. For measuring aggregate performance, the weighted speedup metric was used.

There are three sources of performance impact on CEASER. First, potential change in cache miss-rate because of the change in the group of lines that get mapped to a given set of the cache, which alters the conflict misses (this can sometimes improve hit rate and sometimes degrade hit rate, although the overall impact is negligible). Second, the increase in access latency of the cache due to the latency of the encryption process (translating the physical line-address into an encrypted line-address). And, third, extra misses incurred due to relocation of lines as such relocated lines can evict a useful line from the set where the line got remapped to (albeit by design, such relocations are done at a rate of 1 every 100 accesses, so the impact on miss rate due to relocation is bounded to 1%).

As discussed above, for the rate-mode workloads, CEASE and CEASER cause an average performance loss of 0.32% and 0.74%, respectively. Sphinx3, for example, sees a 2% improvement due to reduced conflict misses. Overall, across all 134 workloads, CEASE and CEASER incur a slowdown of only 0.68% and 1.1% respectively.

CEASER affects cache misses due to randomization (which can affect conflict misses, either positively or negatively) and remapping (the remapped line may evict a useful line from the remapped set). The impact of CEASER on the miss-rate and MPKI (misses per 1000 instructions) of the LLC was measured. Table 3 shows the miss rate and MPKI of the baseline 8 MB LLC and with CEASER, for the 34 rate-mode workloads.

TABLE 3

Impact of CEASER on the MPKI and Miss-Rate of the LLC (8 MB)

| Workload Name | MPKI Baseline | MPKI CEASER | MissRate(%) Baseline | MissRare CEASER |
|---|---|---|---|---|
| astar | 0.5 | 0.7 | 21.5 | 27.8 |
| bwaves | 18.7 | 18.7 | 100 | 100 |
| bzip2 | 3.5 | 3.6 | 52.6 | 56.8 |
| cactusADM | 5.3 | 5.2 | 97.7 | 96.6 |
| calculix | 0.0 | 0.0 | 68.5 | 68.7 |
| dealII | 2.5 | 2.4 | 65.7 | 66.4 |
| gamess | 0.0 | 0.0 | 3.4 | 3.8 |
| gcc | 16.3 | 16.7 | 80.9 | 82.8 |
| GemsFDTD | 9.8 | 9.8 | 92.8 | 93.2 |
| gobmk | 0.4 | 0.4 | 28.2 | 33.3 |
| gromacs | 0.6 | 0.6 | 35.6 | 37.5 |
| h264ref | 0.5 | 0.6 | 35 | 42.6 |
| hmmer | 0.5 | 0.8 | 17.5 | 28 |
| lbm | 31.9 | 31.9 | 99.9 | 99.8 |
| leslie3d | 7.6 | 7.6 | 91.5 | 92.1 |
| libquantum | 25.4 | 25.4 | 100 | 100 |
| mcf | 67.6 | 68.8 | 72.4 | 73.8 |
| milc | 25.8 | 25.6 | 99.8 | 99 |
| namd | 0.1 | 0.1 | 72 | 73 |
| omnetpp | 20.9 | 21.1 | 87.7 | 88.2 |
| perlbench | 0.8 | 0.8 | 46.7 | 48 |
| povray | 0.0 | 0.0 | 2.2 | 2.2 |
| sjeng | 0.4 | 0.4 | 87.3 | 87.5 |
| soplex | 26.9 | 26.9 | 97.7 | 97.7 |
| sphinx3 | 11.6 | 11.1 | 89.4 | 85.5 |
| tonto | 0.1 | 0.1 | 4.9 | 7 |
| wrf | 6.6 | 6.5 | 97 | 96.8 |
| xalancbmk | 2.2 | 2.2 | 68.9 | 69.9 |
| zeusmp | 4.8 | 4.8 | 96.4 | 96.3 |
| BC | 84.5 | 84.5 | 98 | 98.1 |
| BrendthFS | 37.2 | 37.3 | 96.7 | 96.8 |
| ConnComp | 85.7 | 85.9 | 95.7 | 96 |
| PugeRank | 46.0 | 46.2 | 94.6 | 94.9 |
| SSSPath | 118.8 | 119.0 | 98 | 98.1 |
| Average | 19.5 | 19.6 | 70.5 | 71.7 |

Some low-MPKI workloads (such as astar, gobmk) saw a noticeable increase in MPKI, however, given these workloads are low-MPKI, the impact on performance remains negligible. For sphinx3, the randomization caused the MPKI to get reduced from 11.6 in the baseline to 11.1 with CEASER, and this 5% reduction in MPKI causes improved performance of CEASER compared to the baseline. Overall, CEASER has only a negligible impact on the miss rate of the LLC, increasing it from 70.5% to 71.7%, and also a negligible impact on MPKI, increasing the average MPKI from 19.5 to 19.6.

Example 2

CEASER-S

A Pin-based x86 simulator was used with a detailed memory model. Table 4 shows the configuration used. The L3 cache was an 8 MB shared cache between all of the cores and incurs a latency of 24 cycles. All caches used a line size of 64 bytes. For all implementations of CEASER and CEASER-S, a latency of two cycles was used for encryption and decryption. The default Remap-Rate for both CEASER and CEASER-S was assumed to be 1% (one 16-way set gets remapped every 1600 accesses to the LLC). For all LLC implementations, including the baseline, the SRRIP policy was used.

TABLE 4

Baseline Configuration of CEASER-S

Processor

| | |
|---|---|
| Core parameters | 8-cores, 3.2 GHz |
| L1 and L2 cache | 32 KB, 256 KB |
| | 8-way (private) |

Last Level Cache

| | |
|---|---|
| L3 (shared) | 8 MB, 16-way, 24 cycles |
| | SRRIP [8] |
| | replacement policy |

DRAM Memory-System

| | |
|---|---|
| Bus frequency | 800 MHz (DDR 1.6 GHz) |
| Channels | 2 (8-Banks each, |
| tCAS-tRCD- | 2 KB row buffer) |
| tRP-tRAS | 9-9-9-36 |

A diverse set of workloads was used, including all of the 29 workloads from a SPEC2006 benchmarks suite and 5 workloads from a GAP benchmark suite. For each benchmark, a representative slice of 1 billion instructions was taken and analyzed. The 34 benchmarks were run in rate-mode, where each core ran a copy of the benchmarks. Additionally, 34 mixes formed randomly from these 34 benchmarks were measured.

Timing simulation was performed until all benchmarks in the workload finished executing a minimum of 1 billion instructions. For measuring aggregate performance, the weighted speedup metric was used.

Overall, across all 68 workloads, CEASER caused an average degradation of 1% whereas the default CEASER-S (with two partitions) caused a degradation of 0.7%. With more partitions the overhead of CEASER-S increased, becoming 1% for four partitions (CEASER-S4) to 2% for eight partitions (CEASER-S8). This happened because, with a larger number of partitions, each partition was a reduced number of ways, and this limited the ability to employ intelligent replacement policies to select the best victim within the partition. For example, CEASER-S16 would degenerate the cache using random replacement, as the victim partition would get selected randomly and the partition would contain only 1 way. Two partitions were used in the default implementation of CEASER-S.

CEASER affected cache misses due to randomization (which can affect conflict misses, either positively or negatively) and remapping (the remapped line may evict a useful line from the remapped set). The impact of CEASER and CEASER-S on the MPKI (misses per 1000 instructions) of the LLC was analyzed. Table 5 shows the MPKI of the baseline 8 MB LLC, CEASER, and CEASER-S for the 34 rate-mode workloads.

TABLE 5

Impact of CEASER and CEASER-S on the MPKI of the LLC (8 MB)

| Workload | Baseline | CEASER | CEASER-S |
|---|---|---|---|
| astar | 0.3 | 0.7 | 0.5 |
| bwaves | 18.7 | 18.7 | 18.7 |
| bzip2 | 3.5 | 3.8 | 3.7 |
| cactusADM | 5.3 | 5.2 | 5.2 |
| calculix | 0.0 | 0.0 | 0.0 |
| dealII | 2.4 | 2.4 | 2.4 |
| gamess | 0.0 | 0.0 | 0.0 |
| gcc | 16.6 | 16.9 | 16.7 |
| GemsFDTD | 9.8 | 9.8 | 9.8 |
| gobmk | 0.4 | 0.4 | 0.4 |
| gromacs | 0.5 | 0.6 | 0.6 |
| h264ref | 0.5 | 0.6 | 0.6 |
| hmmer | 0.5 | 0.8 | 0.7 |
| lbm | 31.9 | 31.9 | 31.9 |
| leslie3d | 7.6 | 7.6 | 7.6 |
| libquantum | 25.4 | 25.4 | 25.4 |
| mcf | 67.8 | 69.0 | 69.0 |
| milc | 25.8 | 25.6 | 25.6 |
| namd | 0.1 | 0.1 | 0.1 |
| omnetpp | 21.0 | 21.2 | 21.2 |
| perlbench | 0.8 | 0.8 | 0.8 |
| povray | 0.0 | 0.0 | 0.0 |
| sjeng | 0.4 | 0.4 | 0.4 |
| soplex | 26.9 | 26.9 | 26.9 |
| sphinx3 | 11.6 | 11.1 | 11.2 |
| tonto | 0.1 | 0.1 | 0.1 |
| wrf | 6.6 | 6.6 | 6.6 |
| xalancbmk | 2.2 | 2.2 | 2.2 |
| zeusmp | 4.8 | 4.8 | 4.8 |
| BC | 84.5 | 84.6 | 84.5 |
| BreadthFS | 37.2 | 37.3 | 37.3 |
| ConnComp | 85.8 | 86.0 | 86.0 |
| PageRank | 46.0 | 46.2 | 46.2 |
| SSSPath | 118.8 | 119.0 | 119.0 |
| Average | 19.5 | 19.6 | 19.6 |

For sphinx3, randomization caused the MPKI to get reduced from 11.6 in the baseline to 11.1 with CEASER and to 11.2 with CEASER-S, and this reduction in MPKI resulted in slight performance improvement compared to the baseline. For other workloads, the impact on MPKI was found to be negligible. Overall, similar to CEASER, CEASER-S increased the average MPKI of the baseline from 19.5 to 19.6.

The power overheads of CEASER-S result from the encryption circuit, the remapping of lines (one line per 100 access), and the extra misses (0.4% extra memory accesses). With CEASER-S, the overall system power increased by approximately 0.3% and the overall system energy by less than 1% (mainly due to the slowdown).

While the present disclosure has been described in connection with a plurality of exemplary aspects, as illustrated in the various figures and discussed above, it is understood that other similar aspects can be used, or modifications and additions can be made to the described aspects for performing the same function of the present disclosure without deviating therefrom. For example, in various aspects of the disclosure, methods and compositions were described according to aspects of the presently disclosed subject matter. However, other equivalent methods or composition to these described aspects are also contemplated by the teachings herein. Therefore, the present disclosure should not be limited to any single aspect, but rather construed in breadth and scope in accordance with the appended claims.

What is claimed is:

1. A method comprising:
   mapping respective physical line addresses (PLAs) to respective cache locations in a cache, each respective PLA having an associated memory line;
   encrypting, with a cipher using a first key, a first PLA of the PLAs to provide a first encrypted line address (ELA), the first ELA having an associated first encrypted cache location;

encrypting, with the cipher using a second key, a second PLA of the PLAs to provide a second ELA, the second ELA having an associated second encrypted cache location;

generating a first epoch identifier with the first key and a second epoch identifier with the second key;

associating the first key with the first epoch identifier and the second key with the second epoch identifier;

designating a relocation pointer to be remapped using the second key;

encrypting, with the cipher using the second key, the relocation pointer, such that the one or more cache locations are respectively remapped with a new ELA, each new ELA having the second epoch identifier assigned thereto;

upon receiving a request to access the memory line associated with the first PLA, encrypting, using the first key, the first PLA into the first ELA to determine the first encrypted cache location;

accessing the first encrypted cache location;

assigning the first epoch identifier to the first ELA;

assigning the second epoch identifier to the second ELA; and transmitting data stored at the first encrypted cache location;

wherein the relocation pointer designates one or more cache locations selected from at least one of a cache set, a cache way, a cache bank, or the cache.

2. The method of claim 1, wherein the cipher comprises a low-latency block cipher.

3. The method of claim 2, wherein the low-latency block cipher comprises a four-stage Feistel Network having a round function comprising a substitution-permutation network.

4. The method of claim 1, wherein the encrypting the relocation pointer occurs upon an event selected from the group consisting of:

determining that the number of times that the cache has been accessed is greater than a predetermined threshold; and determining that a random number generated by a random number generator matches a predetermined value.

5. A method comprising:

mapping respective physical line addresses (PLAs) to respective cache locations in a cache, each respective PLA having an associated memory line;

encrypting, with a cipher using a first key, a first PLA of the PLAs to provide a first encrypted line address (ELA), the first ELA having an associated first encrypted cache location;

encrypting, with the cipher using a second key, a second PLA of the PLAs to provide a second ELA, the second ELA having an associated second encrypted cache location;

generating a first epoch identifier with the first key and a second epoch identifier with the second key;

designating a relocation pointer to be remapped using the second key; and encrypting, with the cipher using the second key, the relocation pointer, such that the one or more cache locations are respectively remapped with a new ELA, each new ELA having the second epoch identifier assigned thereto.

6. The method of claim 5 further comprising:

encrypting, with the cipher using a second key, a second PLA of the PLAs to provide a second ELA, the second ELA having an associated second encrypted cache location;

designating a relocation pointer to be remapped using the second key; and transmitting data stored at the first encrypted cache location.

7. The method of claim 5 further comprising:

associating the first key with the first epoch identifier and the second key with the second epoch identifier;

assigning the first epoch identifier to the first ELA; and assigning the second epoch identifier to the second ELA;

wherein the relocation pointer designates one or more cache locations selected from at least one of a cache set, a cache way, a cache bank, or the cache.

8. The method of claim 7 further comprising:

determining that each of the ELAs is encrypted with the second key;

disassociating the first key from the first epoch identifier;

associating the second key with the first epoch identifier; and associating a third key with the second epoch identifier.

9. A method comprising:

mapping respective physical line addresses (PLAs) of a plurality of PLAs to respective cache locations of a plurality of cache locations in a cache, each PLA of the plurality of PLAs having an associated memory line;

encrypting, with a block cipher using a first key, a first PLA of the plurality of PLAs to provide a first encrypted line address (ELA), the first ELA having an associated first encrypted cache location;

upon receiving a request to access a first memory line associated with the first PLA, encrypting, using the first key, the first PLA into the first ELA to determine the associated first encrypted cache location;

accessing the first encrypted cache location;

generating a first epoch identifier with the first key and a second epoch identifier with a second key;

associating the first key with the first epoch identifier and the second key with the second epoch identifier;

assigning the first epoch identifier to the first ELA;

encrypting, with the block cipher using the second key, a second PLA of the plurality of PLAs to provide a second ELA, the second ELA having an associated second encrypted cache location;

assigning the second epoch identifier to the second ELA;

designating a relocation pointer to be remapped using the second key, wherein the relocation pointer designates one or more cache locations selected from at least one of a cache set, a cache way, a cache bank, or the cache;

upon receiving a subsequent request to access the first memory line associated with the first PLA and determining that the first ELA is identified with the second epoch identifier, encrypting, with the block cipher using the second key, the first PLA to provide a re-encrypted first ELA having an associated updated first encrypted cache location; and accessing the associated updated first encrypted cache location.

10. The method of claim 9 further comprising partitioning the cache into two or more partitions, each partition having:

a first partition key and a second partition key associated therewith, the first partition key and the second partition key separate from any partition keys associated with any other partitions; and a first partition epoch identifier and a second partition epoch identifier associated therewith, the first partition epoch identifier and the second partition epoch identifier separate from any partition epoch identifiers associated with any other partitions;

wherein the subsequent request to access the first memory line associated with the first PLA is received and processed by each of the two or more partitions independently and simultaneously.

11. A conflict-based cache attack system comprising:
a memory comprising memory lines; and
a processing platform comprising one or more processors in communication with the memory and one or more storage devices, the processor comprising:
   cores; and
   a cache comprising cache locations shared between the cores;
wherein respective physical line addresses (PLAs) are mapped to respective cache locations in the cache, each PLA having an associated memory line;
wherein the processing platform executes one or more instructions that cause the system to:
   encrypt, with a block cipher using a first key, a first PLA of the PLAs to provide a first encrypted line address (ELA), the first ELA having an associated first encrypted cache location;
   upon receiving a request to access the memory line associated with the first PLA, encrypt, using the first key, the first PLA into the first ELA to determine the first encrypted cache location;
   access the first encrypted cache location;
   generate a first epoch identifier with the first key and a second epoch identifier with a second key;
   associating the first key with the first epoch identifier and the second key with the second epoch identifier;
   assign the first epoch identifier to the first ELA;
   encrypt, with the block cipher using the second key, a second PLA of the PLAs to provide a second ELA, the second ELA having an associated second encrypted cache location;
   assign the second epoch identifier to the second ELA; and
   designate a relocation pointer to be remapped using the second key;
   wherein the relocation pointer designates one or more cache locations selected from at least one of: a cache set, a cache way, a cache bank, or the cache; and
wherein the processing platform executes one or more instructions that further cause the system to one or more of (i)-(iv):
   (i) record, in a counter, a number of times that the cache has been accessed:
      determine that the counter is greater than a predetermined threshold; and
      encrypt, with the block cipher using the second key, the relocation pointer, such that the cache locations are respectively remapped with a new ELA, each new ELA having the second epoch identifier assigned thereto;
   (ii) generate, with a random number generator, a random number;
      determine that the random number matches a predetermined value; and
      encrypt, with the block cipher using the second key, the relocation pointer, such that the cache locations are respectively remapped with a new ELA, each new ELA having the second epoch identifier assigned thereto;
   (iii) determine that each of the ELAs is encrypted with the second key;
      disassociate the first key from the first epoch identifier;
      associate the second key with the first epoch identifier; and
      associate a third key with the second epoch identifier; or
   (iv) upon receiving a new request to access the memory line associated with the first PLA and determining that the first ELA is identified with the second epoch identifier, encrypt, with the block cipher using the second key, the first PLA to provide a re-encrypted first ELA having an associated updated first encrypted cache location; and
      access the associated updated first encrypted cache location.

12. The system of claim 11, wherein the instructions further cause the system to transmit data stored at the first cache location.

13. The system of claim 11, wherein the block cipher comprises a low-latency block cipher comprising a four-stage Feistel Network having a round function.

14. The system of claim 13, wherein the round function comprises a substitution-permutation network; and
wherein the substitution-permutation network is configured randomly at each stage of the four-stage Feistel Network.

15. A conflict-based cache attack system, comprising:
a memory comprising memory lines; and
a processing platform comprising one or more processors in communication with the memory and one or more storage devices, the processor comprising:
   cores; and
   a cache comprising cache locations shared between the cores;
wherein respective physical line addresses (PLAs) are mapped to respective cache locations in the cache, each PLA having an associated memory line; and
wherein the processing platform executes one or more instructions that cause the system to:
   encrypt, with a block cipher using a first key, a first PLA of the PLAs to provide a first encrypted line address (ELA), the first ELA having an associated first encrypted cache location;
   upon receiving a request to access the memory line associated with the first PLA, encrypt, using the first key, the first PLA into the first ELA to determine the first encrypted cache location;
   access the first encrypted cache location;
   generate a first epoch identifier with the first key and a second epoch identifier with a second key;
   associating the first key with the first epoch identifier and the second key with the second epoch identifier;
   assign the first epoch identifier to the first ELA;
   encrypt, with the block cipher using the second key, a second PLA of the PLAs to provide a second ELA, the second ELA having an associated second encrypted cache location;
   assign the second epoch identifier to the second ELA;
   designate a relocation pointer to be remapped using the second key, wherein the relocation pointer designates one or more cache locations selected from at least one of: a cache set, a cache way, a cache bank, or the cache;

upon receiving a new request to access the memory line associated with the first PLA and determining that the first ELA is identified with the second epoch identifier, encrypt, with the block cipher using the second key, the first PLA to provide a re-encrypted first ELA having an associated updated first encrypted cache location;

access the associated updated first encrypted cache location; and partition the cache into two or more partitions, each partition having (i) a first partition key and a second partition key associated therewith, the first partition key and the second partition key separate from any partition keys associated with any other partitions and (ii) a first partition epoch identifier and a second partition epoch identifier associated therewith, the first partition epoch identifier and the second partition epoch identifier separate from any partition epoch identifiers associated with any other partitions;

wherein the new request to access the memory line associated with the first PLA is received and processed by each of the two or more partitions independently and simultaneously.

\* \* \* \* \*